Oct. 20, 1931.   F. B. YINGLING   1,828,013
TILE ASSEMBLING AND PASTING MACHINE
Filed May 1, 1924   20 Sheets-Sheet 2

Inventor
F. B. YINGLING.
Attorney

INVENTOR
F. B. YINGLING

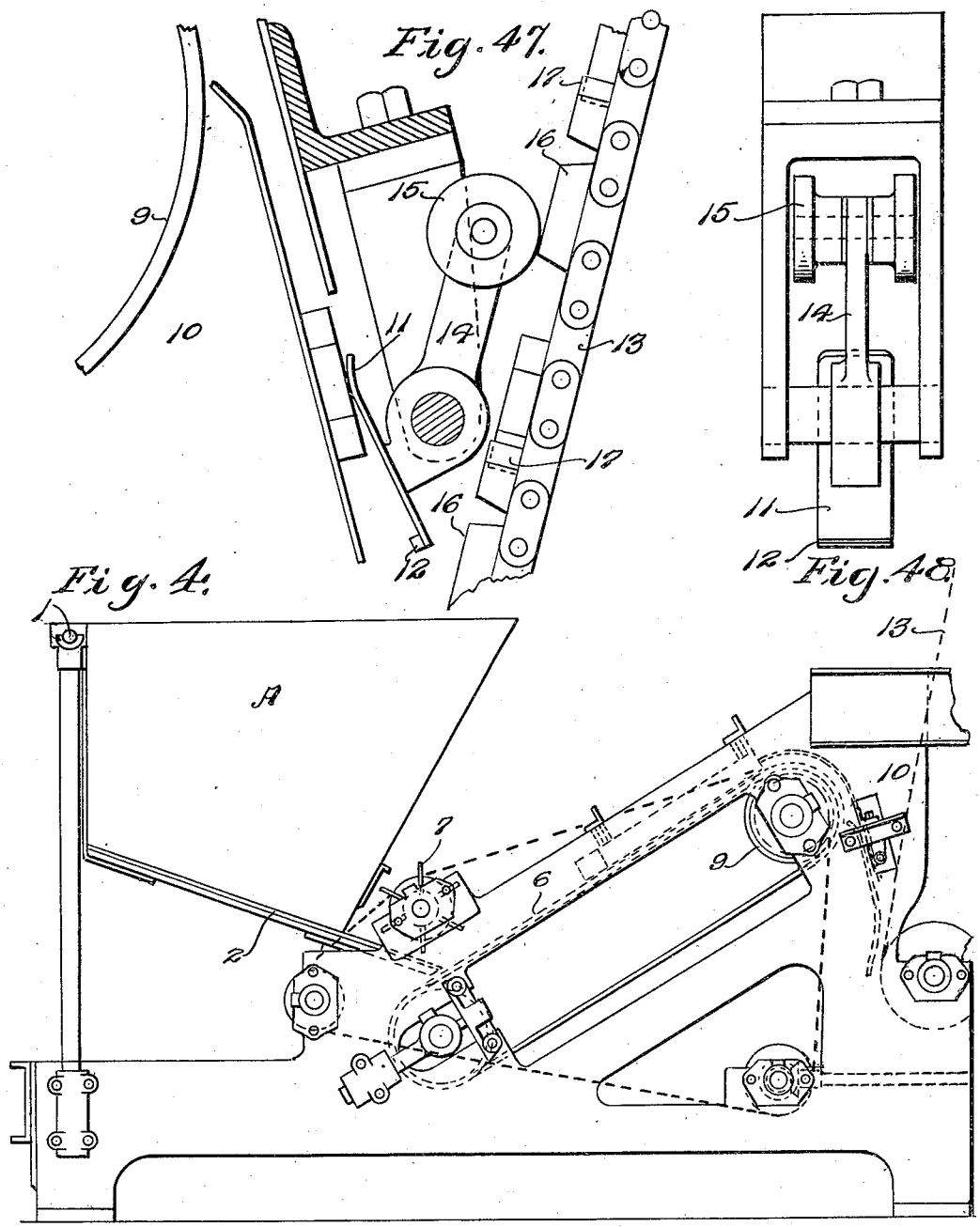

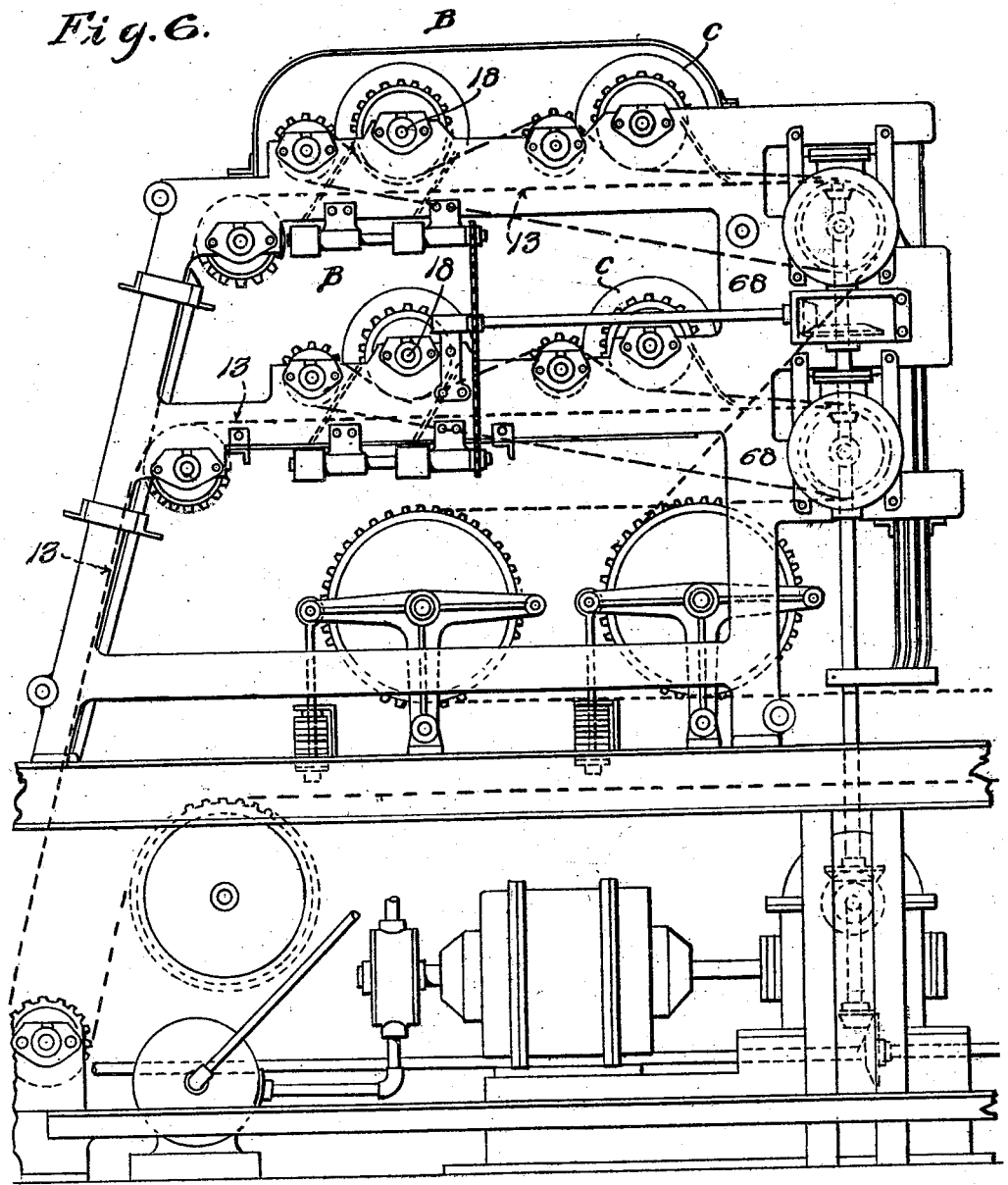

Oct. 20, 1931.  F. B. YINGLING  1,828,013
TILE ASSEMBLING AND PASTING MACHINE
Filed May 1, 1924  20 Sheets-Sheet 6
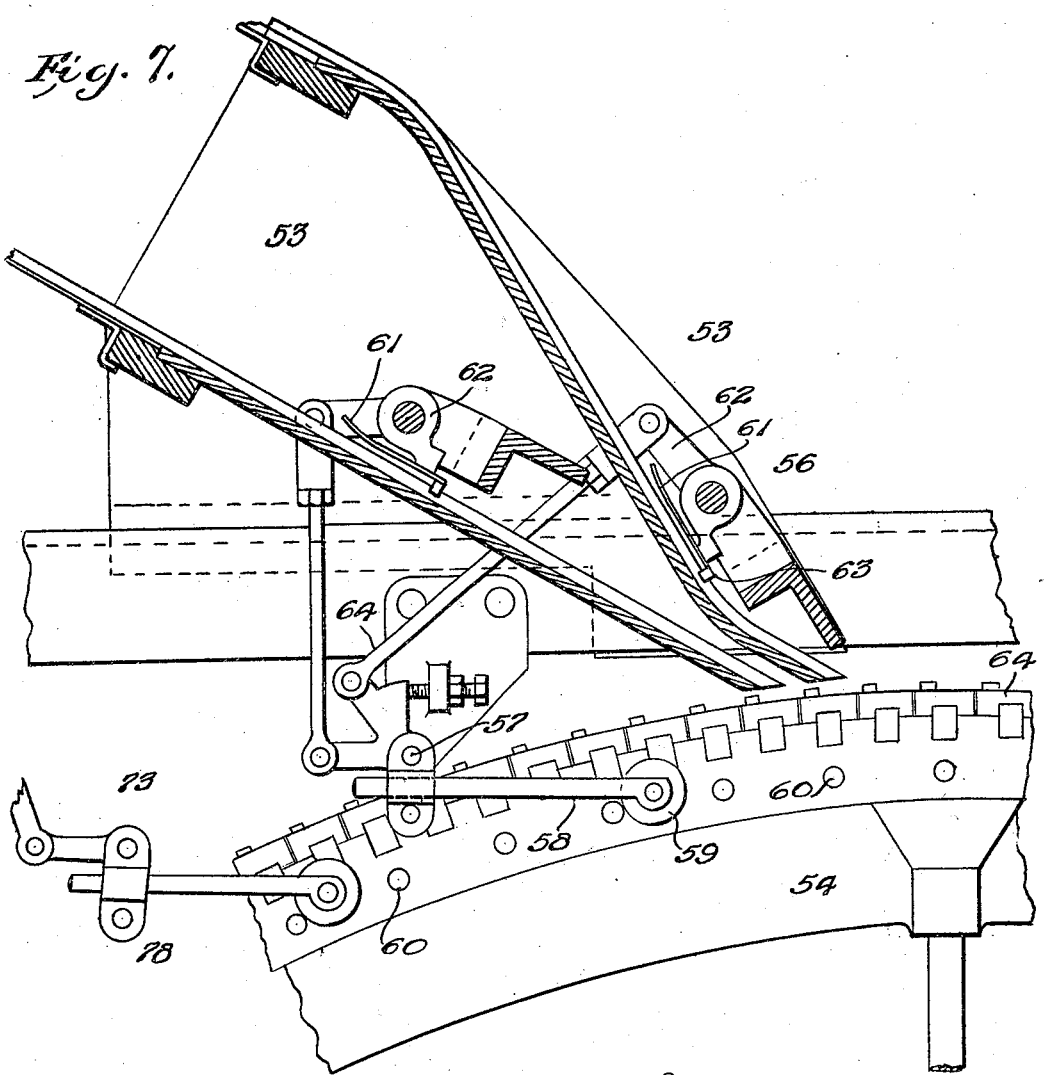
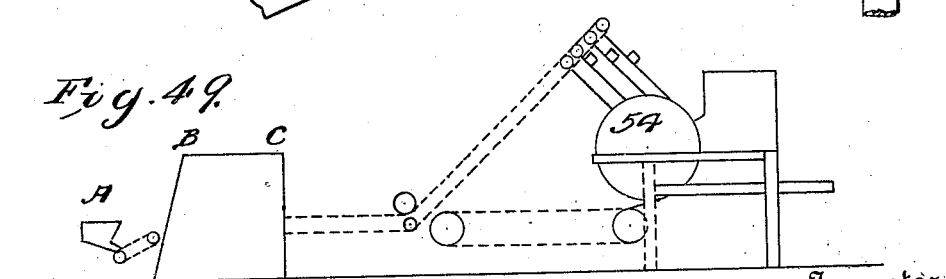
Inventor
F. B. YINGLING
Attorney

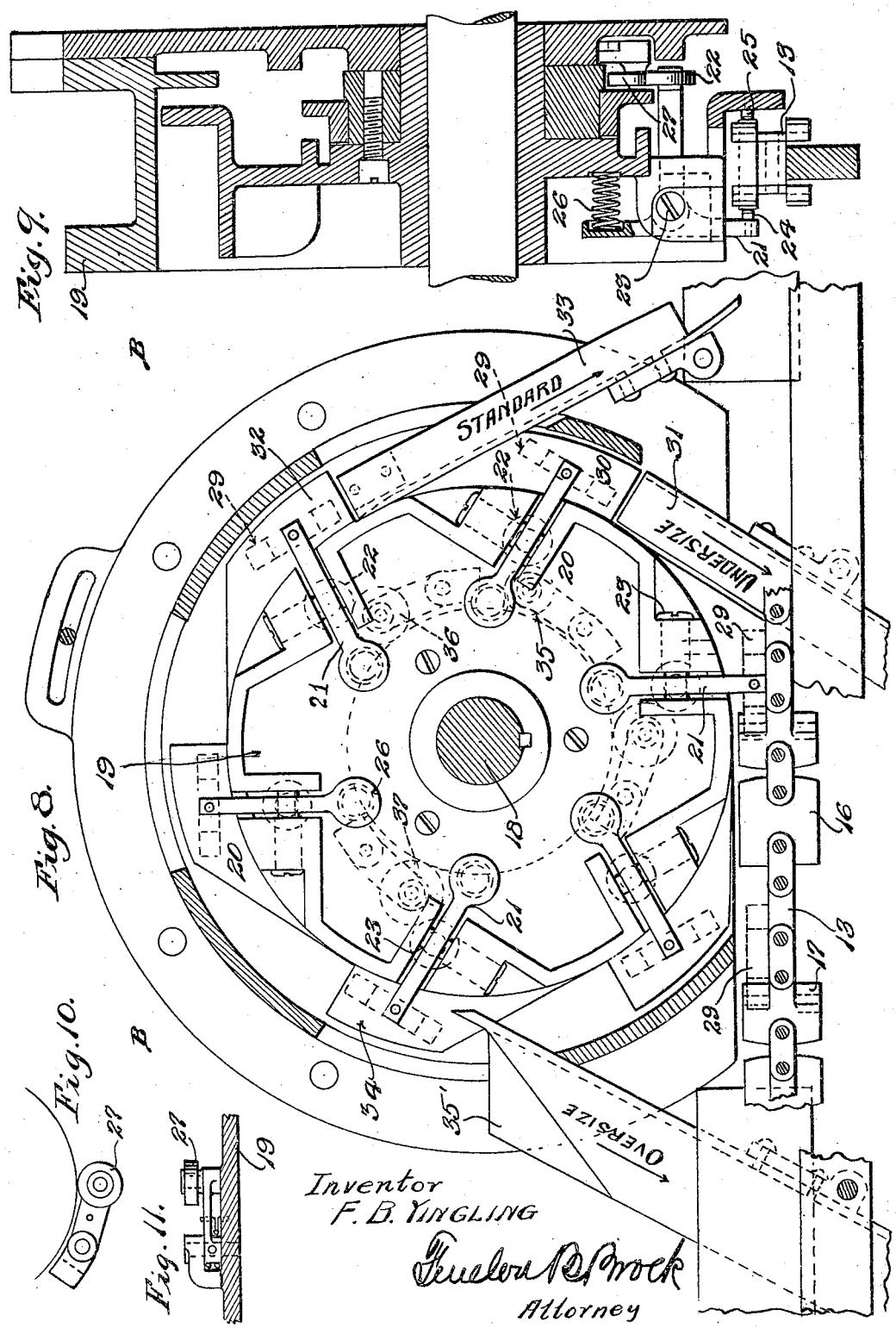

Oct. 20, 1931.     F. B. YINGLING     1,828,013
TILE ASSEMBLING AND PASTING MACHINE
Filed May 1, 1924     20 Sheets-Sheet 8
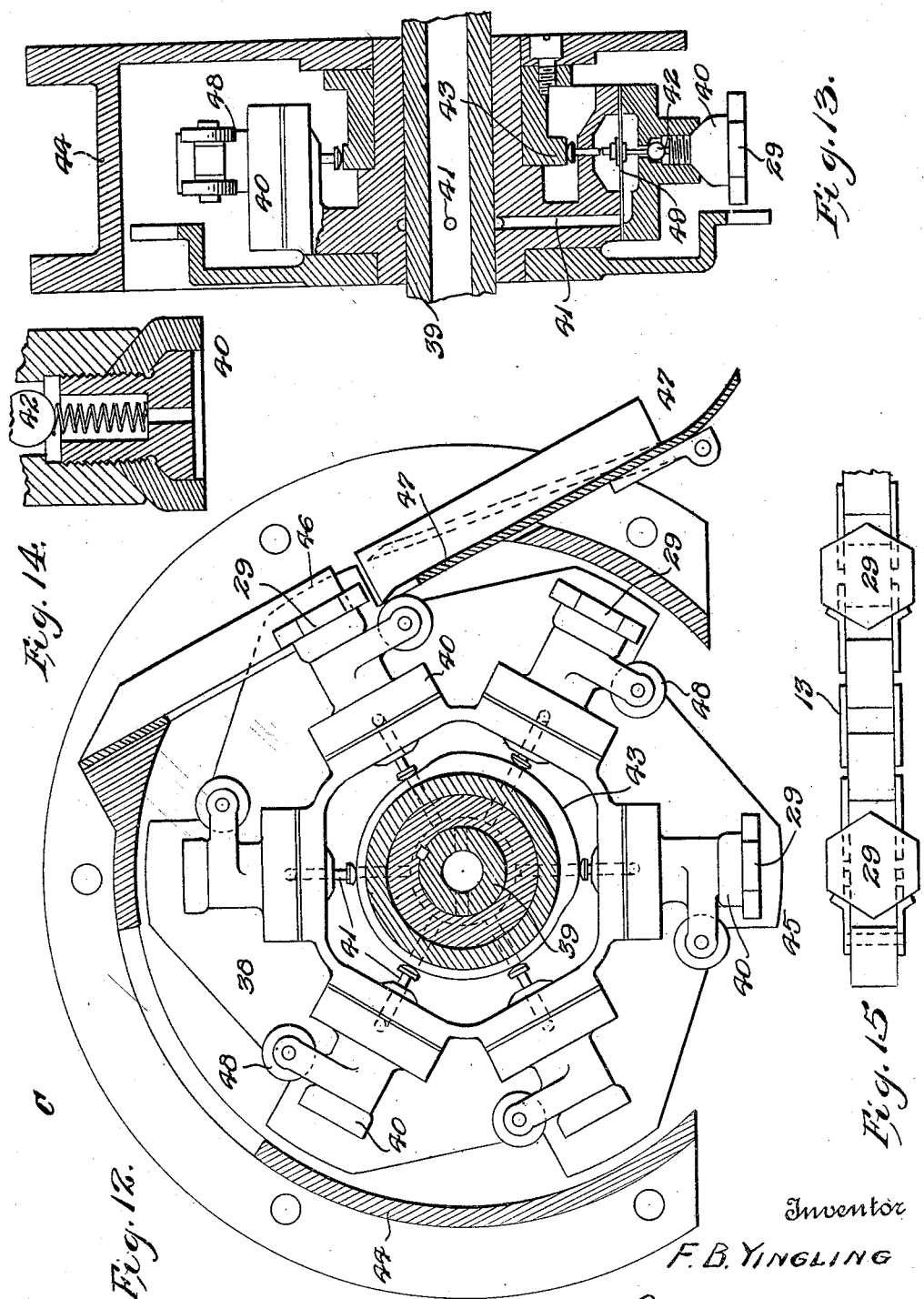
Inventor
F. B. Yingling
Attorney Oct. 20, 1931.  F. B. YINGLING  1,828,013
TILE ASSEMBLING AND PASTING MACHINE
Filed May 1, 1924   20 Sheets-Sheet 9

Inventor:
F. B. Yingling

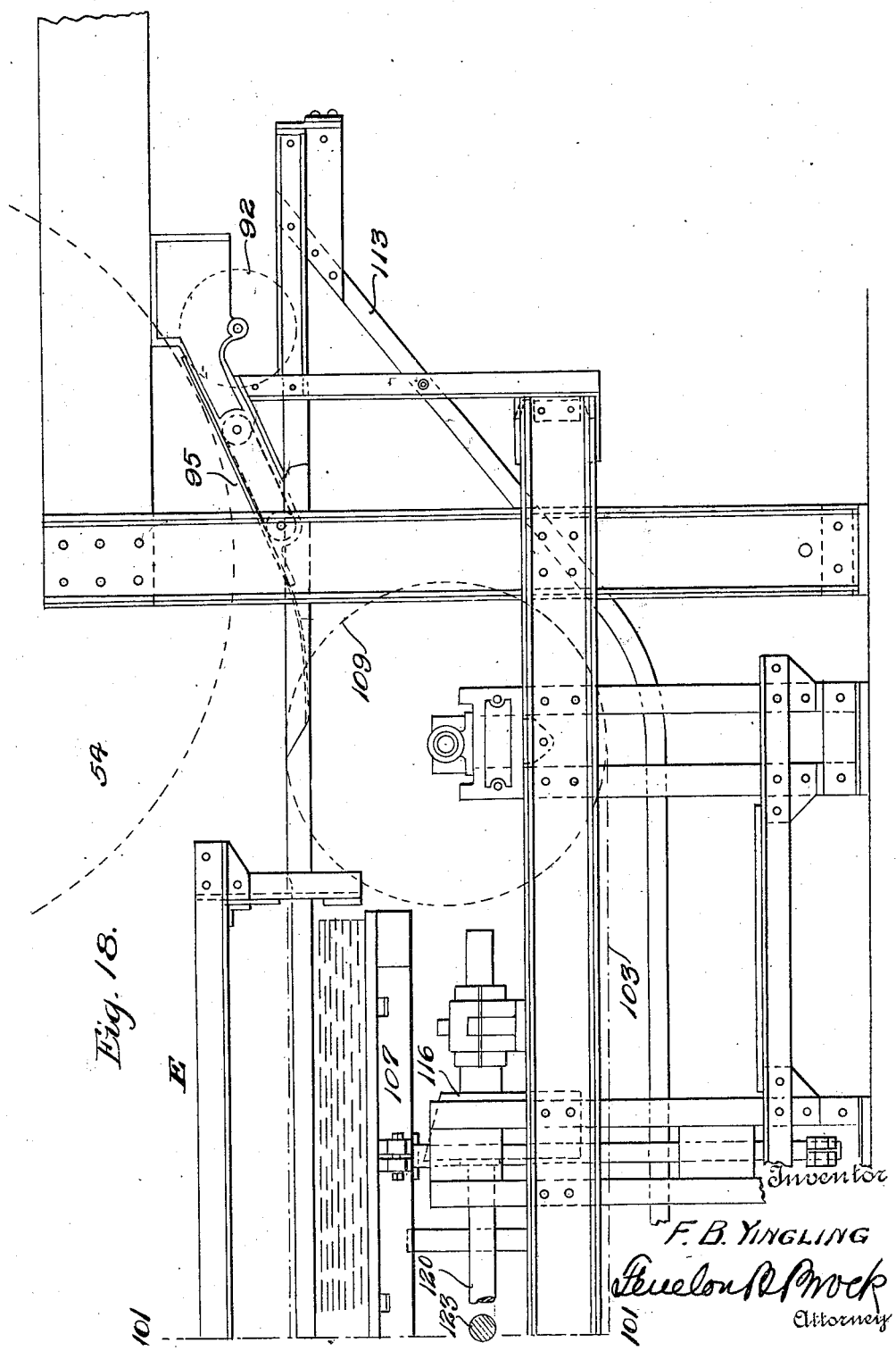

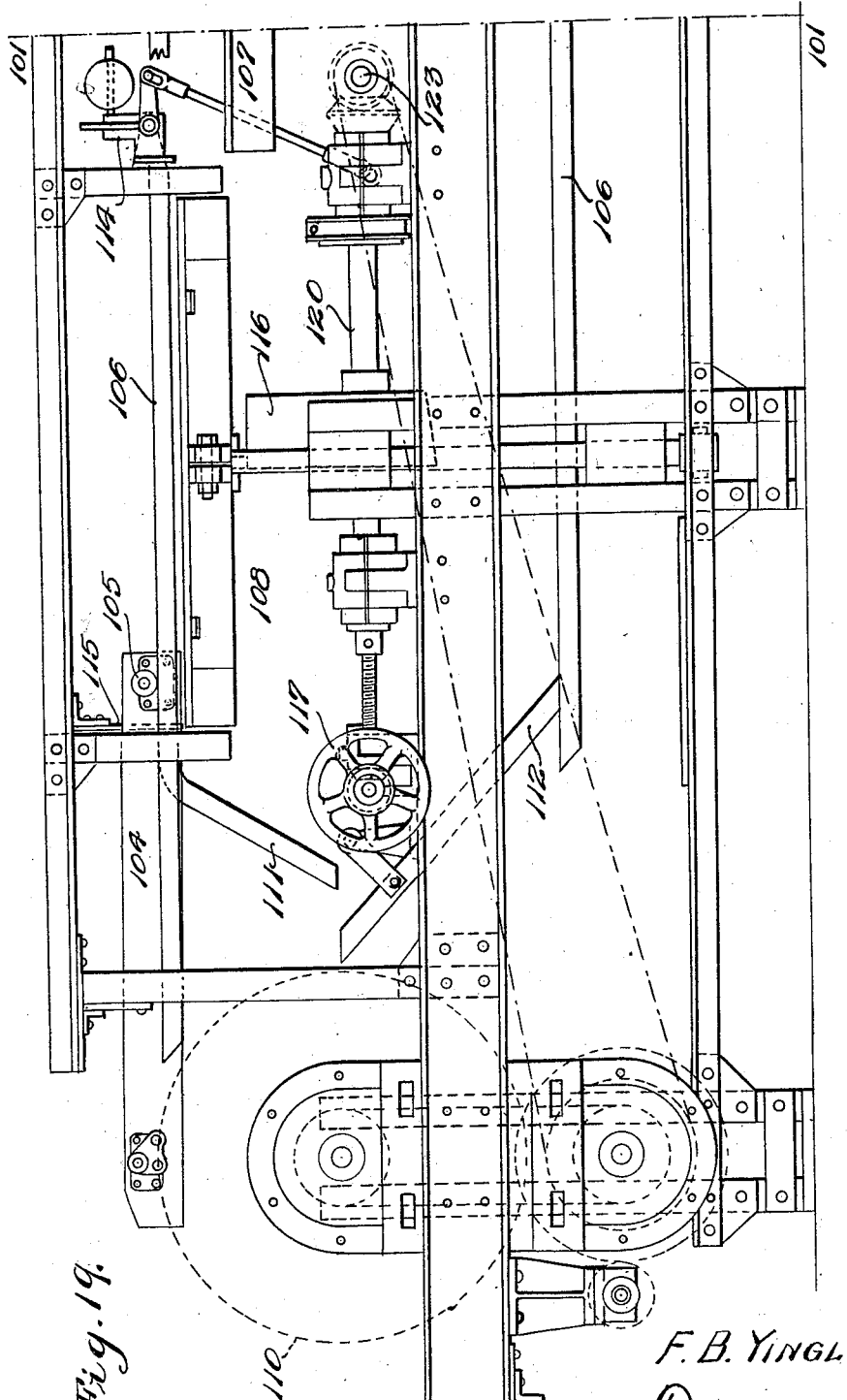

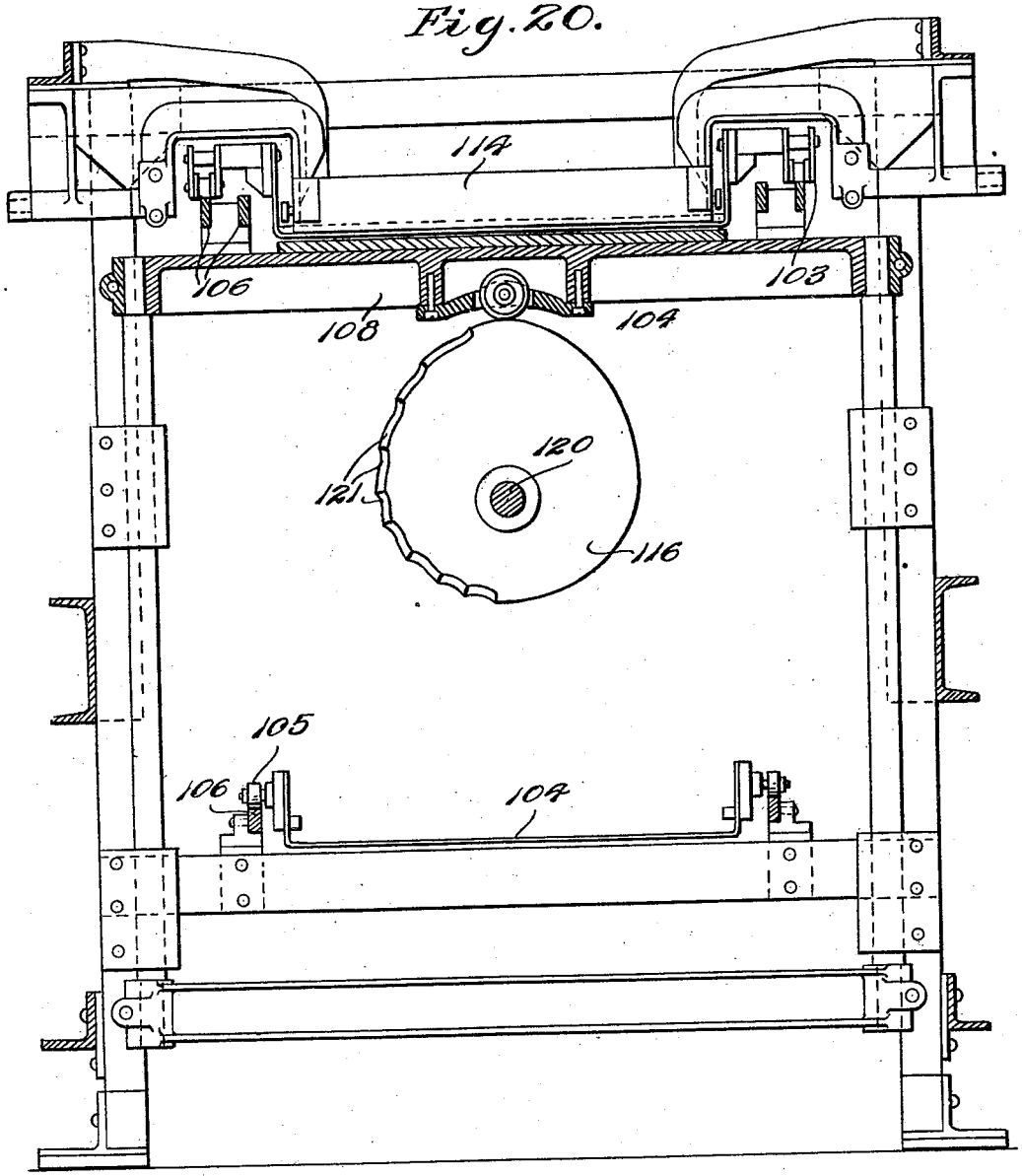

Oct. 20, 1931.  F. B. YINGLING  1,828,013
TILE ASSEMBLING AND PASTING MACHINE
Filed May 1, 1924  20 Sheets-Sheet 13
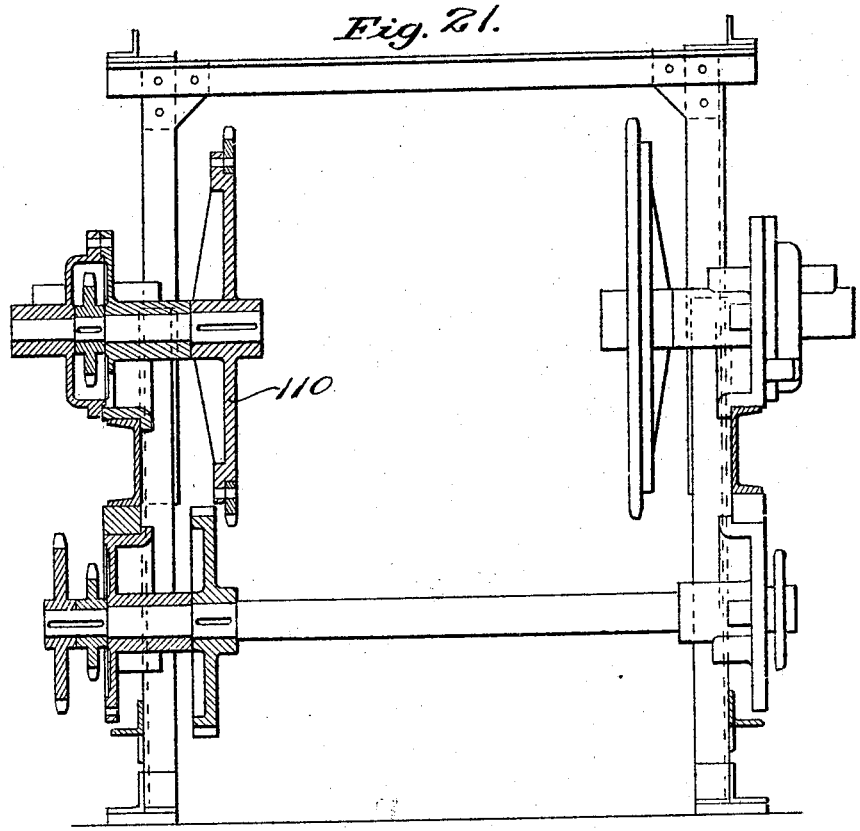
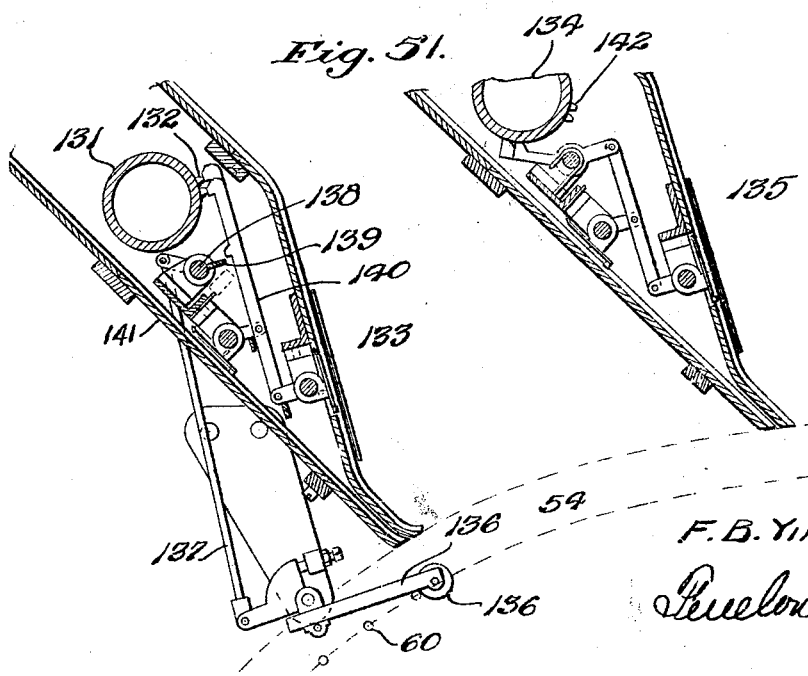
Inventor:
F. B. YINGLING.

Oct. 20, 1931. F. B. YINGLING 1,828,013
TILE ASSEMBLING AND PASTING MACHINE
Filed May 1, 1924 20 Sheets-Sheet 14
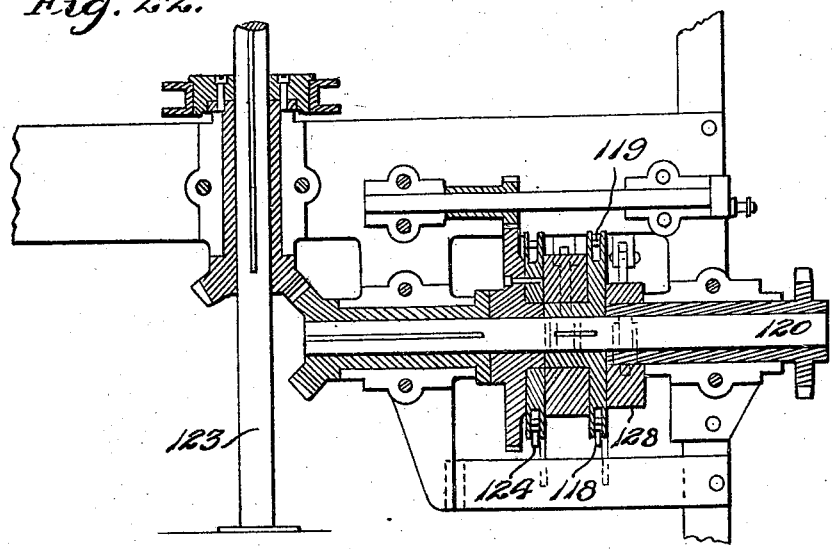
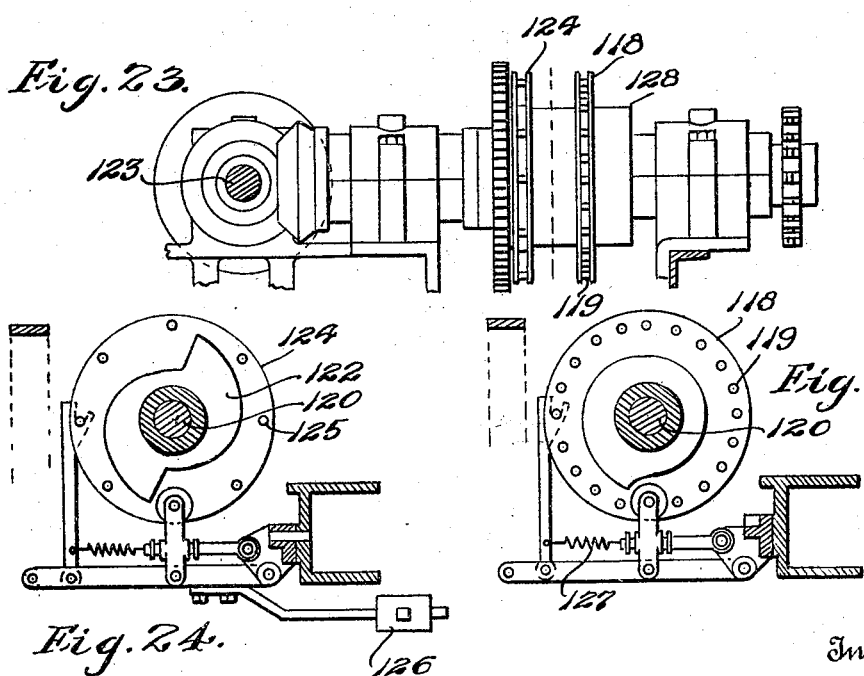
Inventor
F. B. YINGLING Oct. 20, 1931. F. B. YINGLING 1,828,013
TILE ASSEMBLING AND PASTING MACHINE
Filed May 1, 1924 20 Sheets-Sheet 15

Inventor
F. B. YINGLING

Phelon B. Brock
Attorney

Oct. 20, 1931.  F. B. YINGLING  1,828,013
TILE ASSEMBLING AND PASTING MACHINE
Filed May 1, 1924   20 Sheets-Sheet 16
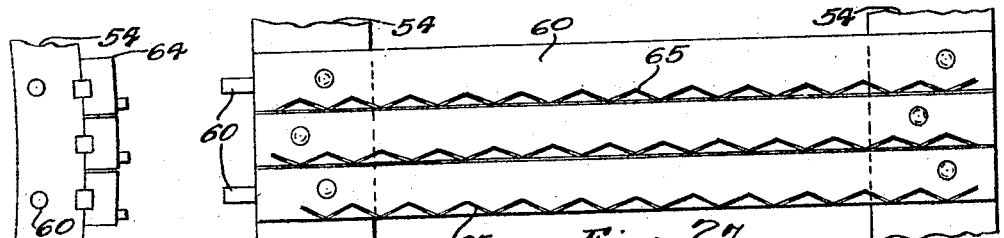
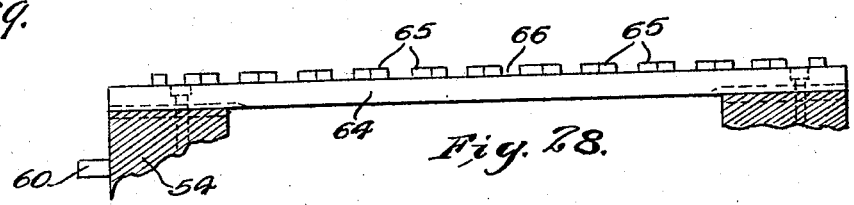
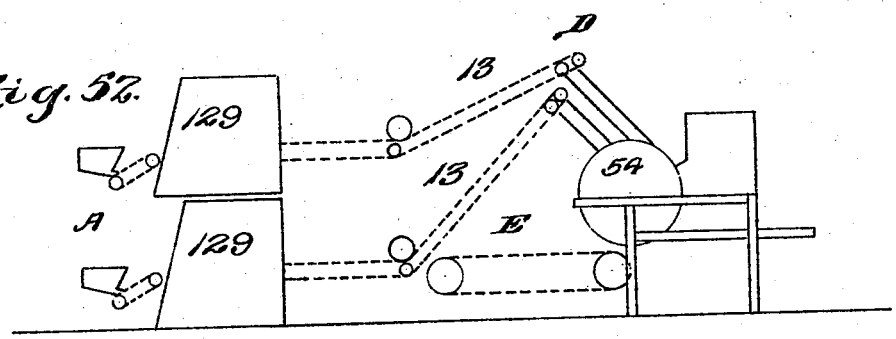
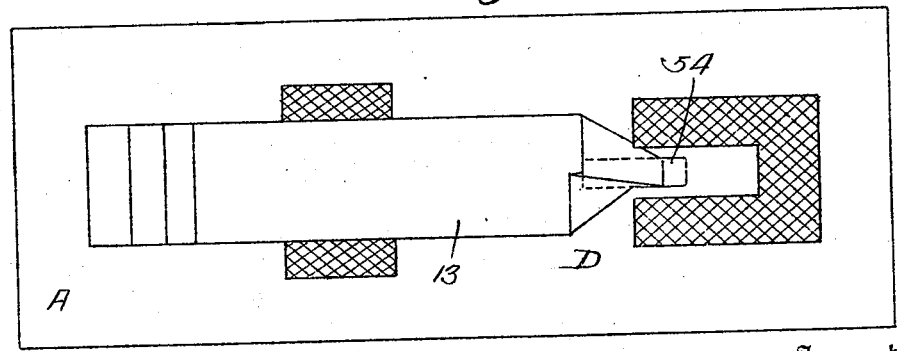
Inventor
F. B. YINGLING.
Attorney

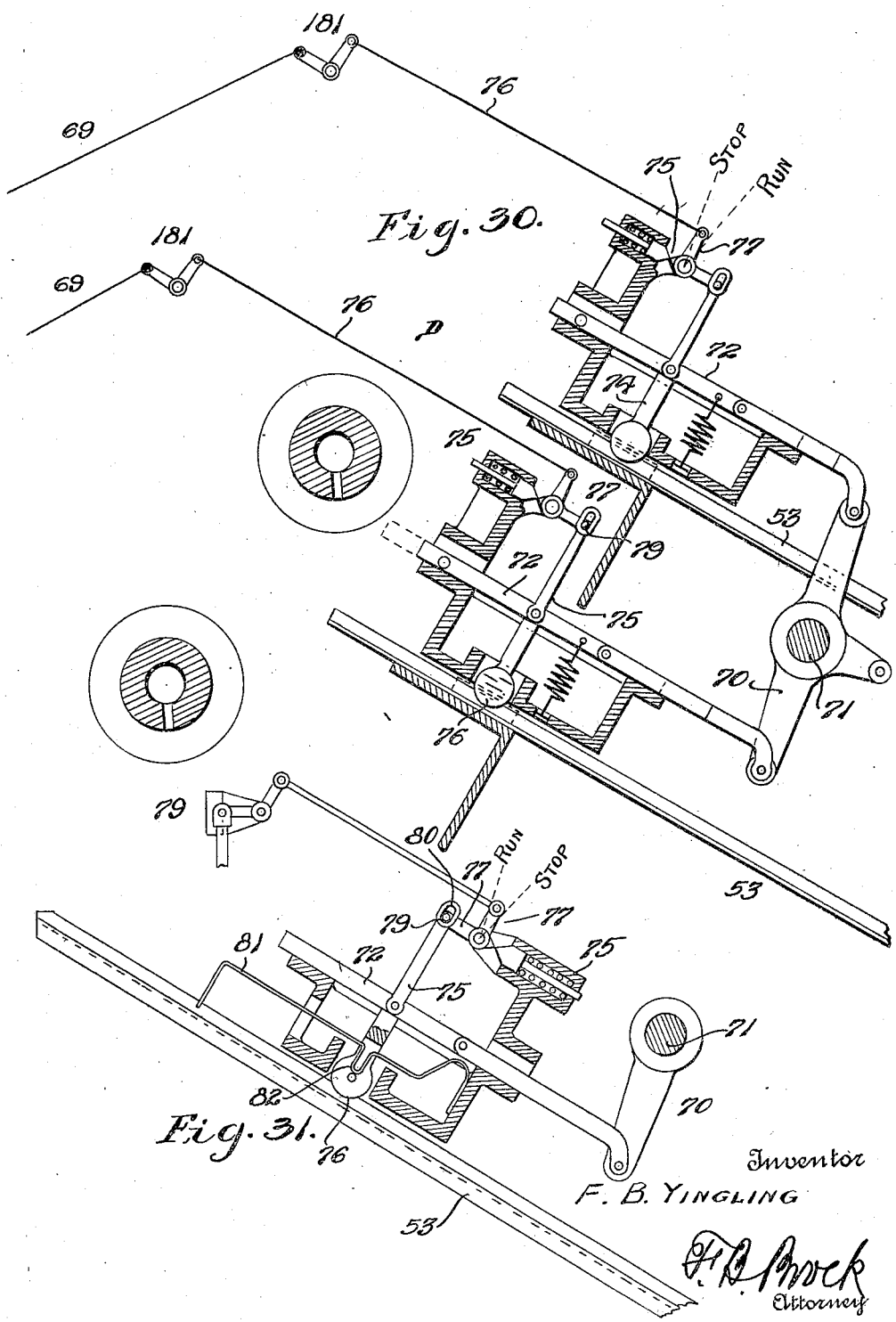

Oct. 20, 1931.   F. B. YINGLING   1,828,013
TILE ASSEMBLING AND PASTING MACHINE
Filed May 1, 1924   20 Sheets-Sheet 18
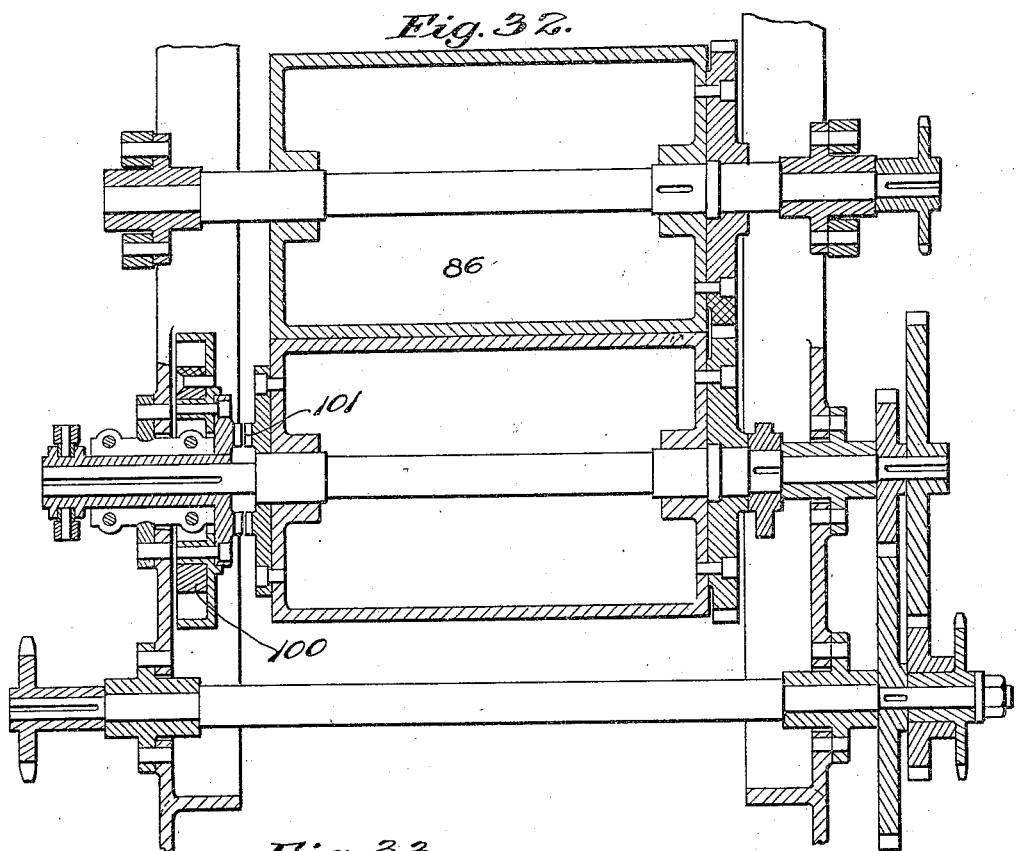
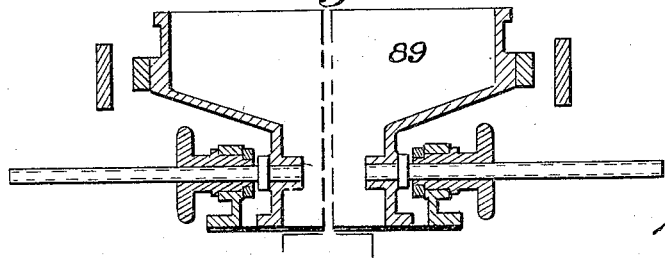
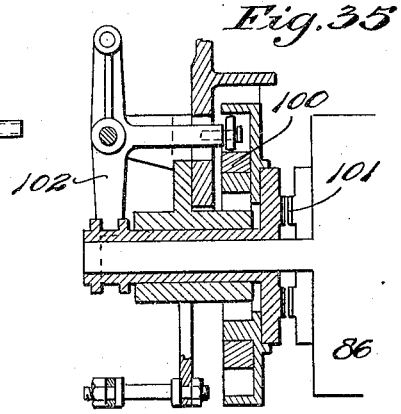
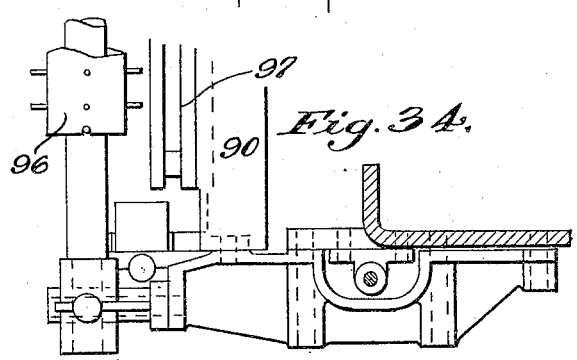
Inventor:
F. B. YINGLING

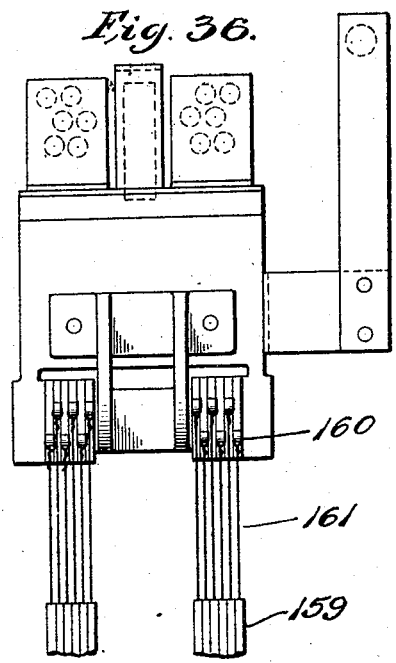
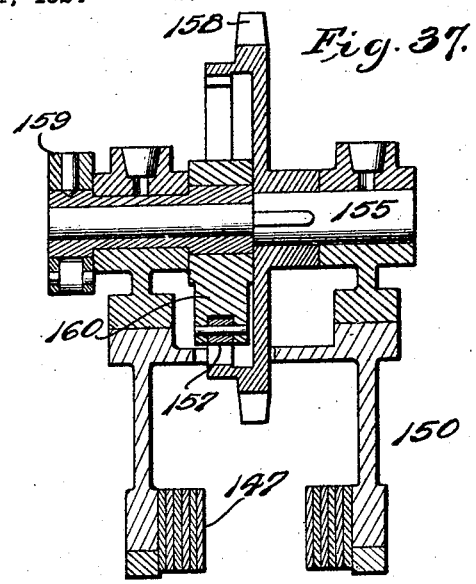
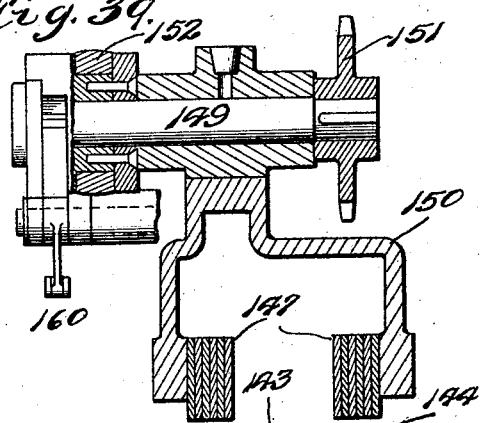
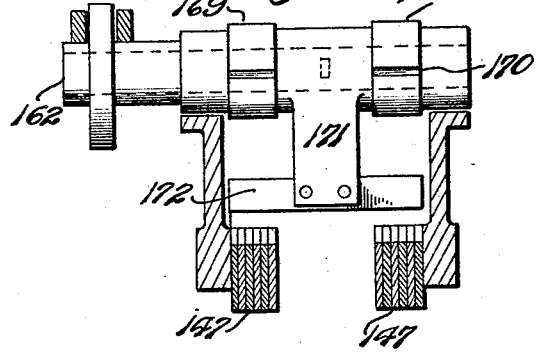
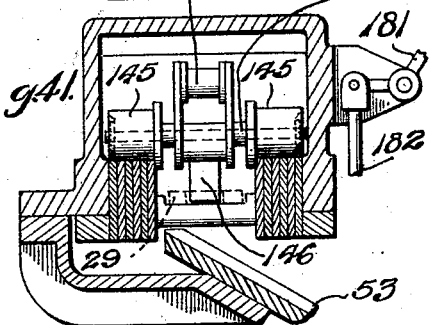
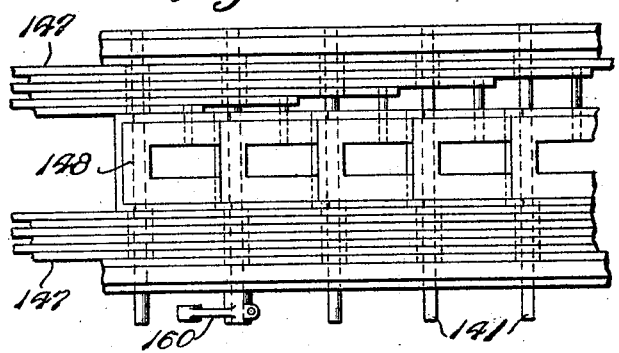

Oct. 20, 1931.  F. B. YINGLING  1,828,013
TILE ASSEMBLING AND PASTING MACHINE
Filed May 1, 1924   20 Sheets-Sheet 20

INVENTOR.
F. B. YINGLING.
BY
ATTORNEY.

Patented Oct. 20, 1931

1,828,013

UNITED STATES PATENT OFFICE

FRANK B. YINGLING, OF HAMILTON, OHIO

TILE ASSEMBLING AND PASTING MACHINE

Application filed May 1, 1924. Serial No. 710,383.

In this machine the tile are started in bulk from a hopper and distributed on carrier chains which convey the tile to a sorting mechanism, which first sizes or measures the tile and eliminates those which are not standard. The tile which need turning over are then subjected to a turning mechanism. In both of these operations the tile are taken from the carrier chain and again put back thereon ultimately all face side up. The tile then traverse an inspection station for further examination, after which they are carried to the storage chutes located above an assembly drum.

In the particular machine illustrating my invention in this instance one inch hexagonal tile are dealt with. These tile are deposited from the storage chutes into successive staggered rows on the assembly drum. To do this practically the carrier is preferably double deck at the sizing and turn over operations and then concentrated at the inspection station and afterward the tile are deposited upon the assembly drum in plural chutes in tandem formation. This construction effects a great economy in space and compactness.

The paper to which the tile sections are pasted is fed from a roll, sheared at its edges, pasted, cut in sections, and applied to the face of a given area of tile upon the assembly drum. The pasted section is heated, delivered to a carrier, and fed to a series of pallet carriers which endlessly travel over stacker tables. The pasted tile sections are automatically loaded on these stacker tables (say ten tile sections). The tables are alternately stacked with tile. These stacker tables gradually descend as the pasted tile sheets are placed thereon. A stack of sheets is removed from one table while the other is being stacked or loaded.

The machine deals with one color of tile, or of two or more contrasting effects. The machine can deposit contrasting tile in endless rows. It can deposit rosettes or contrasting tile here and there in regular or irregular formation. The machine is capable of composing or carrying out any definite pattern or mosaic of contrasting tile in multi-color effect. In performing these various operations the machine makes voids in the base color and fills these voids thereafter with contrasting colored tile, or by means of a cross conveyer system definite patterns or mosaics in multi-color are expeditiously laid out upon the assembly drum for the further operation of pasting and the delivery of the pasted sections.

Where forms and shapes of tile other than one inch hexagon are dealt with, it will of course be understood that this machine would have to be re-adapted for such purpose. Commercial forms of tile are square, rectangular, round and of other polygonal shapes.

In the operation of pressing the tile by tile presses one side of the tile is harder and more perfect than the opposite side. The best tile makers make the face of the tile the best side. The opposite side of the tile is ribbed so that it will take into a plastic setting and be rigidly held therein.

The tile are fed to the machine in gross bulk and are delivered from the machine as a finished product in sheets of a size approximately one foot by two feet and these sheets are ready for the market. The human agency is required for inspection only for defects and for appearance, while testing for size, conveying, regulation of the movement of the tile, etc., are automatically accomplished.

Other novel features forming part of this machine will be hereinafter described more in detail.

In order that the improvements may be readily understood reference is made to the drawings accompanying this application in which hereinbefore mentioned features are set forth.

It should be clearly understood that the drawings and description are merely exemplary of the principle of my invention. It may be embodied in many forms as will be apparent to those skilled in this art.

(In some of the drawings a series of short dashes indicates the conveyer chains; an alternate long and short dash, the drive chains; and a continuous single line, the unwound roll of paper).

Figure 4 (Sheet 4) is a side elevation of the hopper and belt feed mechanism.

Figure 5 (Sheet 4) is a sectional detail of the hopper feed.

Figure 6 (Sheet 5) is an enlarged side elevation of the sorting (sizing and turnover) end of the machine with some of the accompanying operating parts relating thereto.

Figure 6a (Sheet 2) is a detail plan of the feed grating alongside the carrier feed belt.

Figure 7 (Sheet 6) is an enlarged detail view (in elevation and section) showing a portion of the assembly drum and its escapement devices for the tile chutes.

Figure 8 (Sheet 7) is an enlarged elevation and section of parts of the sizing or sorting mechanism.

Figure 9 (Sheet 7) is a transverse sectional view of the same.

Figures 10 and 11 (Sheet 7) are detail views of the release roller device of the sizing mechanism.

Figure 12 (Sheet 8) is an elevation and section of parts of the turnover mechanism.

Figure 13 (Sheet 8) is a transverse section of the same.

Figure 14 (Sheet 8) is a detail section of the mouth of one of the pneumatic turnover cylinders.

Figure 15 (Sheet 8) is a detail of a section of one of the conveyer chains with tile thereon.

Figure 16:
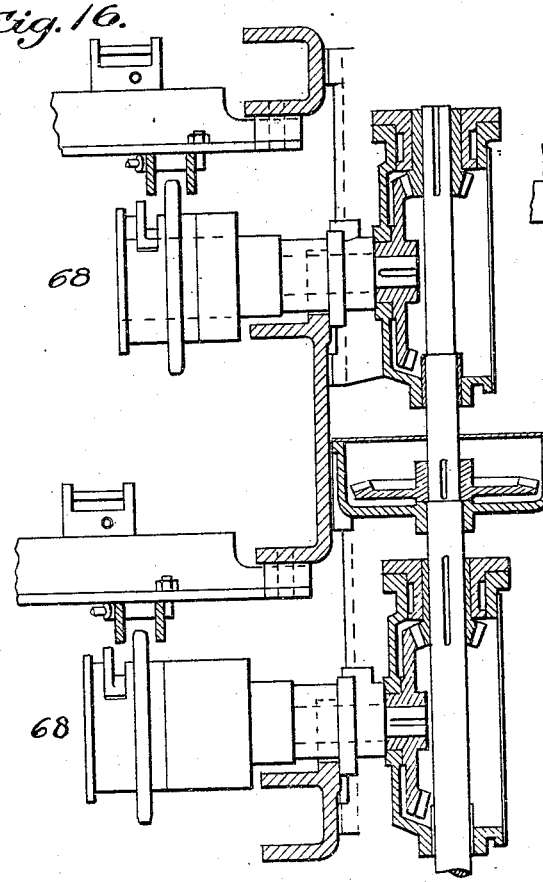

Figure 16 (Sheet 9) is a detail elevation and section of parts of the drive mechanism and clutch throw-offs connected therewith.

Figure 17:
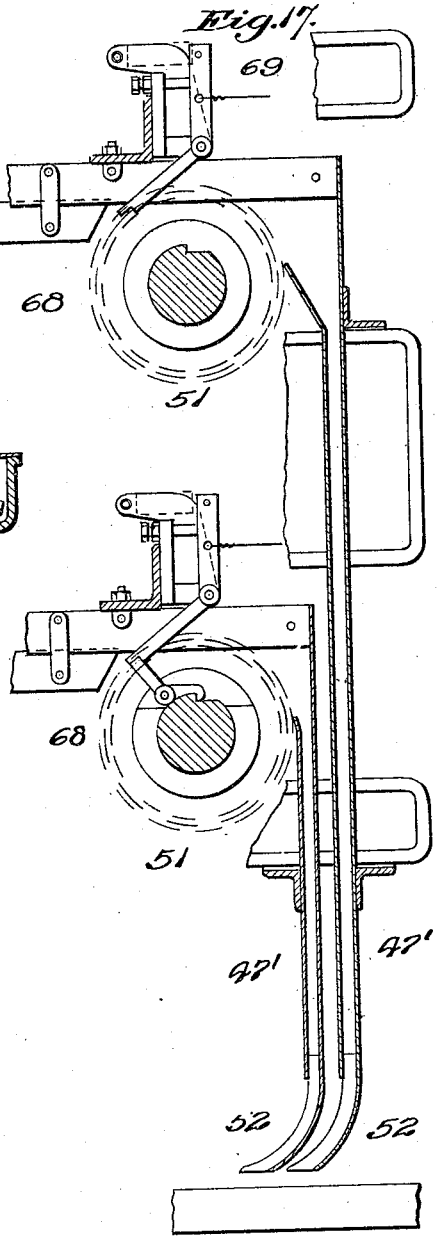

Figure 17 (Sheet 9) is a view transverse to that shown by Fig. 16, showing in addition the vertical tile chutes which take the tile from the conveyer chains near the sorting mechanism and deposit them below in the neighborhood of the inspection station.

Figure 18 (Sheet 10) is a side elevation of the right hand part of the stacker mechanism for the tile sheets, the division between the two parts being indicated by the vertical dotted line 101—101.

Figure 19 (Sheet 11) is a side elevation of the left hand part of the stacker shown in Fig. 18 on divisional line 101—101.

Figure 20 (Sheet 12) is an enlarged view of the stacker taken transversely to the views shown in Figs. 18 and 19, showing certain operative features connected therewith.

Figure 21 (Sheet 13) is another cross section of the stacker mechanism transverse to the side elevations shown by Figs. 18 and 19.

Figure 22 (Sheet 14) is a detail section and elevation of clutch operating parts of the stacker mechanism.

Figure 23 (Sheet 14) is an elevation of the same.

Figure 24 (Sheet 14) is a detail of the stacker-table stripper cam.

Figure 25 (Sheet 14) is a detail of the stacker-table operating cam.

Figure 1:
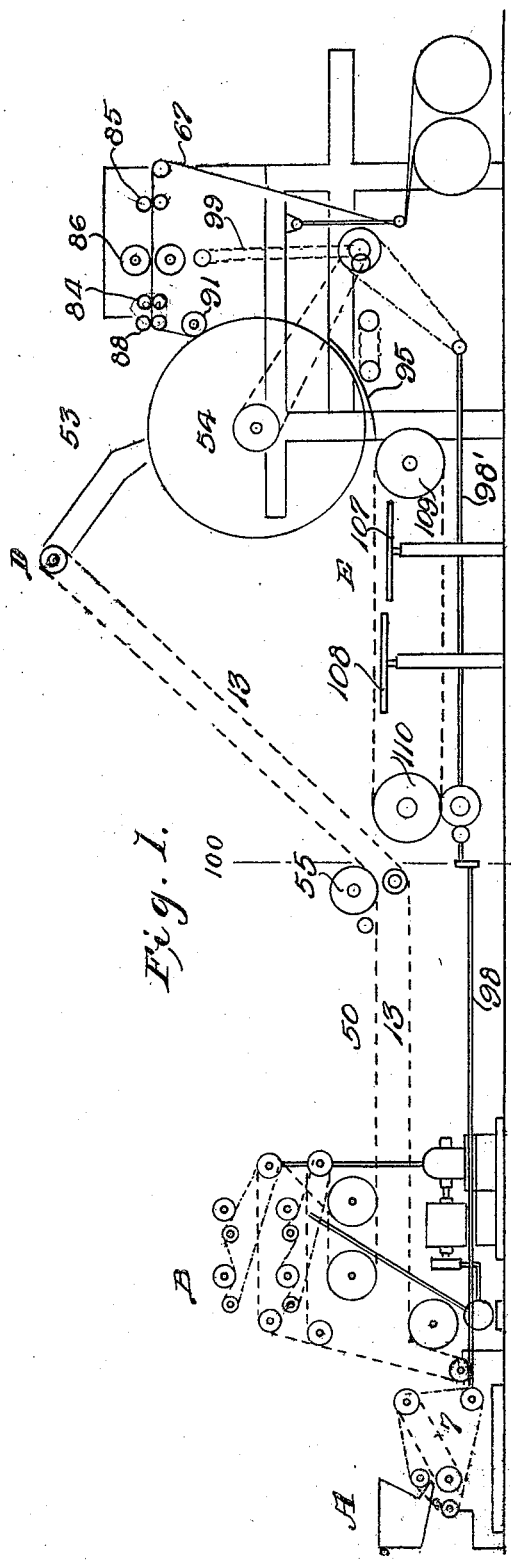
Figure 1 (Sheet 1) is a diagram elevation of the main features of one of the forms of my invention.
Figure 2:
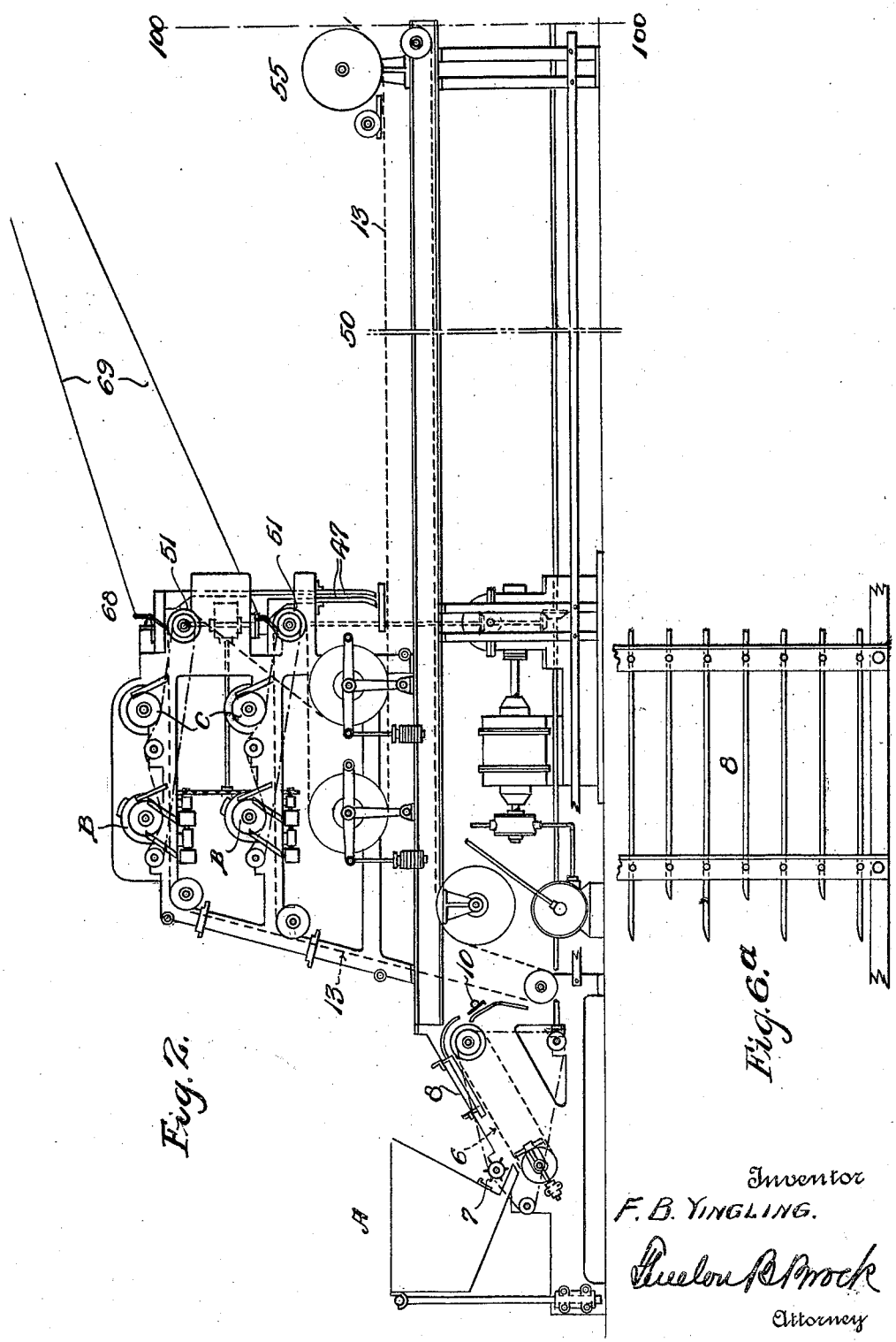
Figure 2 (Sheet 2) is the left hand part of a side elevation of a machine as in Figure 1 embodying the principles of my invention the division between the two parts being indicated by the vertical dotted line 100—100 in Figure 2.
Figure 3:
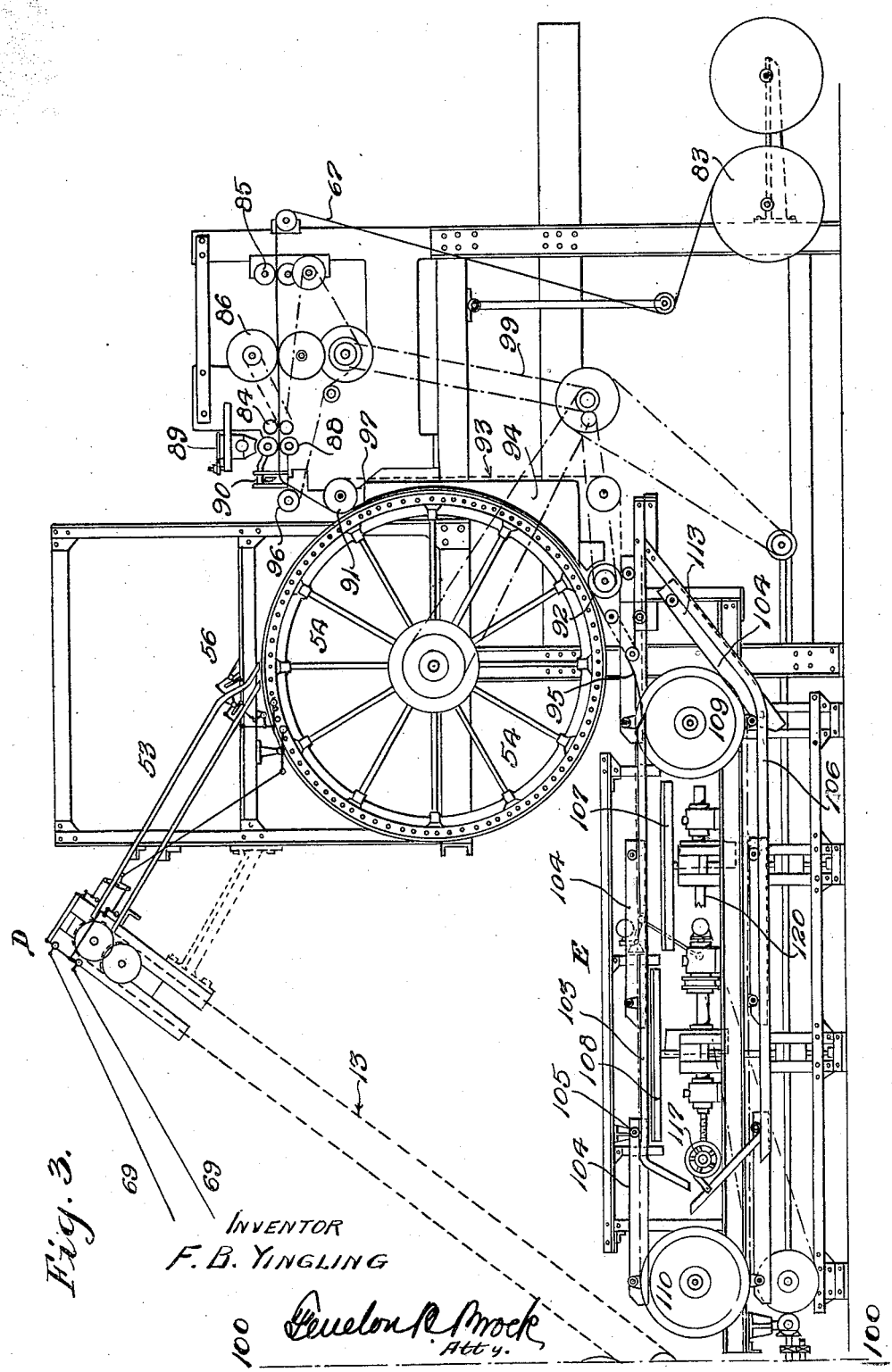
Figure 3 (Sheet 3) is the right hand portion of the side elevation referred to in Fig. 1, to the right of divisional dotted line 100—100. This divisional line is common to both Figs. 1 and 2.
Figure 26:
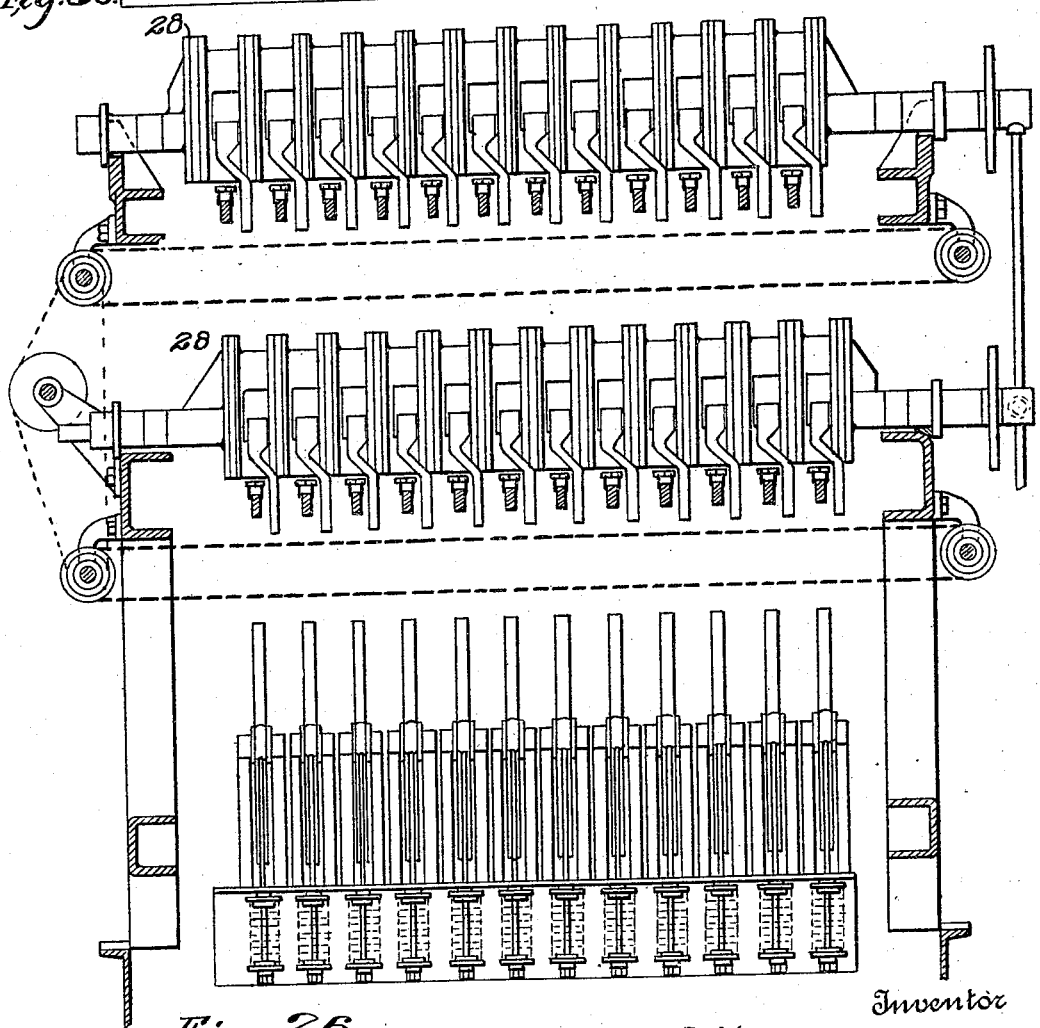

Figure 26 (Sheet 15) is a detail transverse view, partly diagrammatic, of the front part of the machine of Figs. 1, 2, and 3, in the neighborhood of the sorting devices.

Figure 27 (Sheet 16) is a detail plan of the periphery of the assembly drum;

Figure 28, a detail elevation and section, and

Figure 29, a detail end view of the same.

Figure 30 (Sheet 17) is a detail sectional view of a pair of automatic watchmen guarding a pair of storage delivery chutes.

Figure 31 (Sheet 17) is a form of automatic watchman used, in the instance cited, with the cross conveyer system, and, like Fig. 30, is a fragmentary detail.

Figure 32 (Sheet 18) is a vertical section through the paper timing mechanism.

Figure 33 (Sheet 18) is a detail section of the paste reservoir.

Figure 34 (Sheet 18) is a fragmentary plan of the shear support.

Figure 35 (Sheet 18) is a horizontal detail section of the paper timing clutch.

Sheets 19 and 20 are details of the cross conveyer system in which—

Figure 36 is an end view of the rail system counterweights.

Figure 37 is a section through the ratchet wheel shaft.

Figure 38 is a section and elevation in the neighborhood of the cam shaft.

Figure 39 is a section through the sprocket wheel shaft.

Figure 40 is a partial plan of the rail system and gates.

Figure 41 is a section through the chutes, the rail system, and the feed chain.

Figure 42:
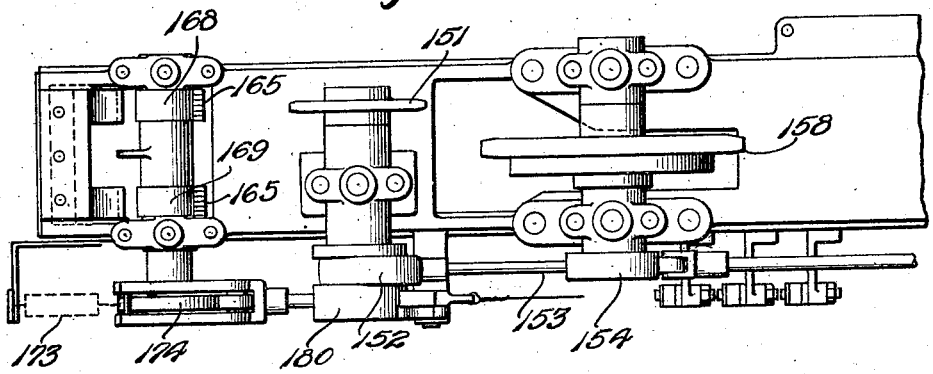

Figure 42 is a plan view of part of the operating mechanism of the cross conveyer system.

Figure 43:
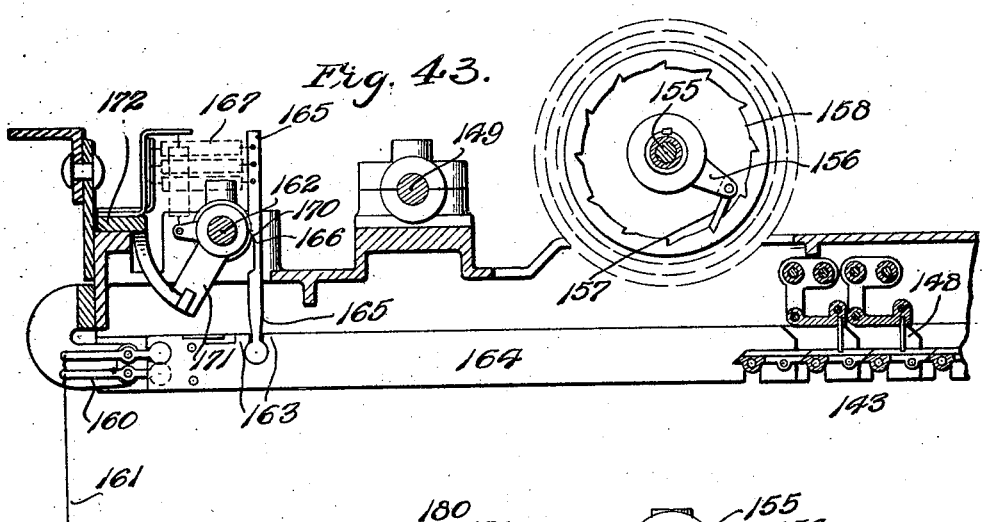

Figure 43 is a sectional elevation on the central line of Fig. 42.

Figure 44:
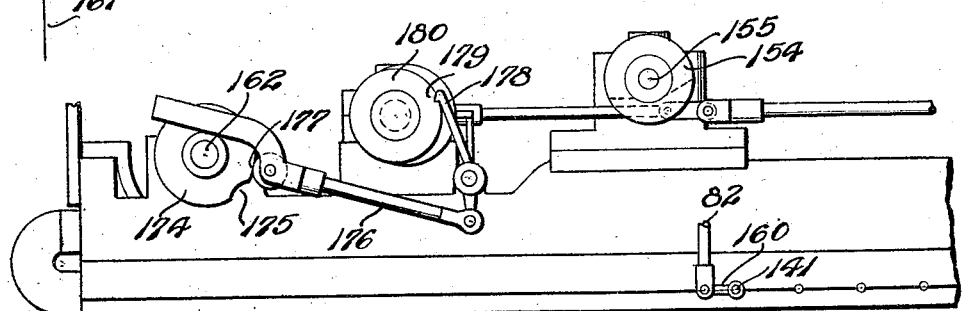

Figure 44 is a side elevation of the device shown in Fig. 42 and shows the switch gear.

Figure 45 (Sheet 1) is a diagram side elevation of a modified form of the invention, the machine of Fig. 1 being quadrupled and double-decked.

Figure 46 (Sheet 1) is a plan diagram of Fig. 45.

Figure 47 (Sheet 4) is a detail elevation of the tile feed escapement device at the delivery end of the carrier feed belt.

Figure 48 (Sheet 4) is an end view of the same.

Figure 49 (Sheet 6) is a diagrammatic elevation of a four color cross conveyer type of machine.

Figure 50:
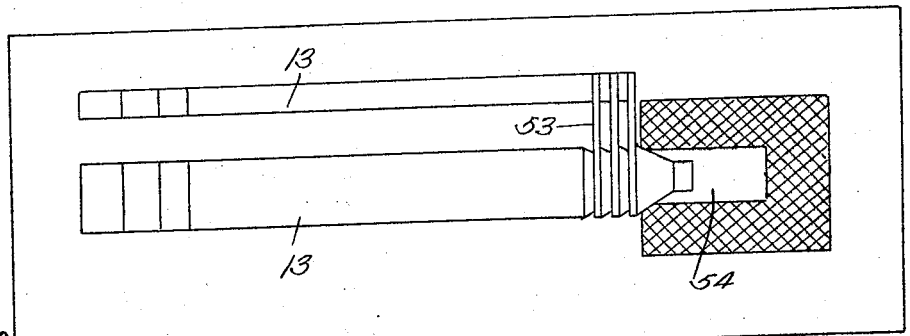

Figure 50 (Sheet 15) is a plan of Fig. 49.

Figure 51 (Sheet 13) are detail cross sections of the escapement devices used on the storage tile chutes when employed for making and filling voids on the tile assembly drum.

Figure 52 (Sheet 16) is a diagram of a double width, double deck type of machine.

Figure 53 (Sheet 16) is a plan of the same.

The hopper tile feeding device A operates as follows:

The hopper bin for the tile 1 is journaled at one of its upper sides. The discharge chute 2 is at a lower diagonally opposite point to the journal. Below the chute on the bin is a roller 3 and below the roller is a rotary shaft 4 driven by the machine. This shaft carries a cam 5 with a more or less abrupt portion thereon which serves to give moderate vibration to the hopper.

Below the discharge of the hopper chute is an endless inclined carrier 6 supported on suitable rollers and driven by the machine for receiving, elevating and separating and distributing the tile received from the hopper. An agitating roll 7 mounted in proximity to the discharge chute aids in feeding and distributing the tile.

Over the face of the carrier belt is suspended a grating 8 consisting of a series of parallel guides which aid in maintaining the proper distribution of the tile. The alternate bars of this grating project toward the receiving side in advance of the intermediate bars and are beveled on the incoming side (see Fig. 6a) to aid in the distribution of the tile upon the belt.

The tile thus spread out and distributed are carried up and over the discharge side of the belt which is the upper roll or gear 9 of the belt, and are dropped downwardly into a guide and escapement device 10. There is one escapement for each row of tile. In this instance there are twenty four escapements, one for each of the twenty four rows of tile handled by this particular machine. There are twenty four guide ways between the parallel bars of the grating.

The escapement device (see Figs. 47 and 48) consists of a leaf spring 11 provided with a stop 12 at its lower end by means of which each tile is separately arrested and held by compound motion of the escapement. When released the tile are deposited upon a carrier chain 13 which has a seat for each succeeding tile. There are twenty four endless carrier chains.

The tile receiving carrier chains rise abruptly or nearly vertical along a path in close proximity to the escapement mechanism just described. The escapement is actuated by a link or lever 14 carried by the escapement device, the free end of which is provided with a roller 15 arranged to contact the carrier chain. There are contact faces or abutments 16 on the chains which periodically engage the roller of the escapement lever, and the escapement is operated to discharge each succeeding tile into successive single seats 17 formed on each tile carrier chain of the series.

The escapement operating projections 16 on the chain alternate with the tile seats 17 carried thereon.

In case tile of more than one color or base color are used in the machine, provision is made for partitioning the hopper A in order that different colored rows of tile may be fed thereto. Such partitioning of the hopper is obvious and is used only in pasting colored tile for borders and the like, and not for use when the machine is adapted to sort out different colored tile into definite patterns.

The machine has a sizing or sorting mechanism B for standardizing the tile. It is a device for plural or multiple measuring by a sorting process.

As one practical embodiment of this feature of the machine the tile are sorted into three sizes which have been termed "oversize" "standard" and "undersize" tile.

Both the oversize and the undersize tile are separately taken out of the general run of tile and conveyed away from the standard tile. The remaining standard tile after passing through the sizing and sorting mechanism are moved forward upon the chains or conveyers 13. The standard tile are those which are to be used in forming the completed pattern.

This particular machine it should be understood was designed only for hexagonal tile. Obvious modifications would be required for tile of other shapes. It should also be understood that the particular product of this machine are panels of tile pasted on a paper sheet of convenient lengths and of the width of twenty four rows of tile, the contiguous edges of which are staggered or interlocked. The machine represents in effect but a single phase of the invention and of the product and process of manufacture.

This being understood—to continue: Proper feed mechanism elsewhere described, delivers the tile from a hopper to an endless carrier chain 13 adjacent to the feed at a point toward the front and lower part of the machine. There are seats 17 on the carrier, one for each tile, and twenty four carrier chains, one for each row of tile making up the papered pattern.

The main sizing-wheel shafts 18 are trunnioned transversely of the frame. There is one shaft mechanism for each alternate row of twelve carrier chains. There is one measuring wheel 19 for each alternate carrier chain and twelve measuring wheels on each sizing wheel mechanism B; or twenty four on both.

Each of these measuring wheels (which are partially light castings) has preferably six radially disposed measuring devices 20. Each measuring element consists of what may be termed a T-shaped lever 21. The vertical outer end of the stem (relatively speaking) carries a journaled roller 2. The horizontal arm of the T-lever, midlength, is fulcrumed upon an eccentric shaped pin 23. One side of the vertical part of the T-lever has a measuring point 24 at its lower end, and opposite thereto there is located a complementary measuring point 25 attached to and rigid with the measuring wheel. The other end of the horizontal jointed arm of tne T-lever carries a spring 26 urging the measuring point inwardly toward the tile.

The before mentioned roller 22 on the end of the lever controls the measuring of the tile.

The opening and closing of the measuring jaws are effected by relatively stationary pivoted lever roller cams 27 supported by the shaft, housing, or frame. The rollers of these T-levers 21 contact at certain points with the stationary roller cams and properly time the measuring function.

Outside of each rotating measuring wheel is located a housing 28, Fig. 26. These are made in multiples the units of which are standardized.

A description of the operation of one of the measuring devices will make the whole system clear. In its rotation the measuring device B approaches the particular chain carrier 13 on which the tile 29 are carried in single succession. When the particular tile is about to be carried into the path of the measuring jaws 24 and 25 the latter are opened by the cam 27. This opening movement is sufficient to admit the largest tile that the machine will handle. Just after the jaws open and coincide with the tile in the movement of the machine the measuring points on the jaws and the jaws themselves close.

Now as the carrier chain in which the tile are seated moves forward, and as the measuring device rotates, it lifts the tile 29 from the carrier seat on the chain and carries it up to the undersize tile station 30. Here the cam action is such that if the tile be undersize, the measuring jaws open and the tile is dropped into a chute 31 and falls upon a transverse carrier belt, and is removed from the machine to a designated bin for such tile (belt and bin not shown).

If however the tile is not undersize the measuring jaws carry it rotatively further along to the standard tile station 32. If the tile be standard the action of the measuring cam releases the jaws and it will be dropped into the standard size chutes 33 and will be carried by gravity back again to the same carrier chain and again deposited upon one of the tile seats thereon.

Discussing still the same tile and the same measuring jaws let us assume that the tile was neither undersize nor standard, as previously assumed, but was oversize. The tile therefore was not dropped at either of the previous stations. But the oversize cam is fashioned so that any tile that will enter the machine larger than undersize or standard will be dropped by the jaws opening after they have been carried around to the last or oversize station 34, and such tile are similarly carried away by chute 35' and a transverse belt and deposited in an appropriate receptacle, as was done in the case of the undersize tile.

The undersize tile are discarded first; after that the standard tile are re-deposited on the tile carrier chain. The oversize tile are discarded last.

The measuring roller 22 on the lever does not contact directly with the cam. An idler roller does the tripping. The measuring roller passes over the idler, the size of which is capable of being varied to perform this function. The idler is not essential. Direct contact can be made between the cam and the lever roller and the idler eliminated (Fig. 8).

The eccentric fulcrum of the measuring lever permits the measuring points to be brought to gauge or a standard size, and set. It also provides for adjustment for wear.

The idler rolls 35, 36, and 37 which do the tripping by contact with the T-levers are three in number. And in addition there is another idler in advance of the three which preliminarily opens the jaws successively, and in a similar manner, the six measuring devices as they approach the tile on the carrier, and thereafter release the jaws to engage the tile.

After the tile are thus engaged and carried along the measuring wheel the first idler roll 35 for the undersize tile is of a given relatively small diameter to measure and discard the tile at the undersize station. The idler roll 36 for the next or standard size is larger, and that for the oversize station is the largest.

So far we have seen the tile taken in bulk from the hopper and fed in a spread-out heterogeneous manner upon a flat endless carrier of a width or greater than the panel or mosaic sections which the tile ultimately form when completed. The tile were deposited by the carrier belt individually and successively upon the seats on a series of carrier chains (twenty four in this example of the invention) and moved up to a sorting or sizing device B operating upon two levels, the alternate carrier chains and the tile carried thereby being sized at one level, and the balance of the tile sorted or measured at another level (Fig. 2).

These measuring devices, it was also seen, have rejected all variations from the standard size. The standards alone were returned to the same carrier chain from which they were taken—the non-standard were thrown out.

This particular machine is designed to handle the better class of tile having a "face" and a "back". The quality of the tile and the peculiar conditions attending their manufacture are described elsewhere.

The standard size tile are returned to the carriers indiscriminately—face or back up. It is highly desirable that they all be deposited on the carrier uniformly—in the present machine all back up.

This machine deals with hexagon tile having a smooth face and a ribbed back, the latter for the purpose of uniting them to their ultimate base or backing by a suitable plastic. The ribbed back also distinguishes the side that is pasted and enables the tile trade to get tile with the best side up when same are placed in the building.

The carrier chains, each on its particular level, are moved along with the tile thereon from the measuring or sizing devices to a turn over mechanism C. There is one for each level. The turn over device is in multiple—one for each carrier. To describe one is to describe all.

The turn over devices are mounted preferably alongside the sizing device further along in the travel of the machine.

Each turn over device 38 consists of a rotary device mounted on a shaft 39 transverse of the frame (Figs. 12 and 13). It has, in this machine, six vacuum cup stations 40 radially disposed about the shaft and equidistant from one another. The shaft is tubular and is pneumatically connected with each cup. The shaft itself is connected to a vacuum pump. Air passages 41 lead from each cup to the shaft, each passage has a check valve 42 therein opening outwardly.

A stationary cam 43 on the housing controls the action of these six check valves leading to the respective vacuum cups. The radially disposed vacuum device with its six cups rotates about this stationary cam.

Outside each of these multiple turn over devices is a housing 44 which when assembled makes a unit protecting the vacuum cup mechanism.

The series of cups successively sweep the plane formed by the upper sides of the tile 29 as they pass thereunder seated on the moving carrier chain.

It is apparent that those tile only which have their smooth faces up will be affected by the suction action of the cups. The extent of the vacuum formed will be insufficient to lift a tile with a grooved recess.

Thus the ribbed backs of the tile oppositely faced will not be affected.

These suction cups 40 of the rotary device are of rubber which can effectively engage only the tile having their smooth faces up. As each cup rotatively reaches its operating position 45 contiguous to the tile on the carrier chain the stationary cam opens the check valve to the vacuum, and if the tile in contact is smooth it will attach itself to that cup and will be carried up to the detaching station 46.

At the detaching station the cam cuts the vacuum off by closing its valve and releases the tile from the suction cup. As the device rotates a stationary stop guide and chute 47 located on the frame or housing detaches the tile turned over upon the same carrier so that all the tile thereon are uniformly placed with their backs up.

The vacuum cup rotary device carries rollers 48 journaled therein which contact the carrier chain as they rotate and depress the chain sufficiently to prevent interference between the tile and chain as the tile attached to a suction cup is carried up to the detaching station.

The air valves 42 are packed to minimize leakage. A diaphragm 49 of leather is provided for this purpose.

The tile 29 on the carrier with their backs up will continue thereon while the tile with their faces up will go to the detaching station and then slide down the chute with their backs up. These pneumatic devices insure therefore all the tile will be presented backs up (all turned the same way) or faces down.

The tile are then carried to the end of the sizing and sorting mechanism where they enter chutes 47 and slide down to the inspection station (50, Fig. 2) at a level lower than either of the series of sizers and turners.

In reaching the inspection station, each carrier, after it has passed the turn over mechanism, is carried over an idler wheel 51 and each tile successively falls into and slides down a gravity chute 47', the lower end 52, Fig. 17 of each of which is curved approximately ninety degrees toward the front of the machine or reversely to the line of travel, so that all the previously "backs up" tile are deposited upon their respective carrier chains to be carried to a further point in the travel of the chain, and at a lower level, completely turned over or face up, for inspection. The discharge-ends of the curved chutes are located just above the upper line of travel of the carrier chains.

At the beginning of this inspection station 50 all the tile (twenty four rows) are now at one level and pass along at that level face side up for a considerable distance. The length of this inspection station should be sufficient to enable all of the tile to be personally inspected for any blemishes, undue variations in color or other undesirable quality, which would tend to mar the aggregate homogeneous color effect so highly requisite in mosaic or other tiling.

From the inspection station the tile are next carried up to a series of storage chutes 53 from which they may be fed to the assembly drum 54.

The agent or carrier 13 it will be understood moves at a high speed in order that the ample supply of tile in reservoir 53 will always be maintained for deposit upon the pasting drum 54. Thus, any losses in tile due to inspection for size at point B, or for appearance or defects at the inspection table 50 will automatically be compensated for and the reservoir 53 will always contain a capacity supply of tile for the finished product. The machine thus functions automatically and continuously and eliminates necessity for interruptions, as by stopping and sorting, after the operation of the machine has once been started.

It will be recalled that this exemplifying machine is designed for hexagonal tile, and that such tile in mosaic assembly are in a way interlocked in a staggered or zig-zag effect.

Although this machine may not be the first to produce unitary panels or sections of mosaic of hexagonal tile it is the first to continuously produce hexagon mosaic panels the contacting sides of which, in the longitudinal line of formation of the panels, are parallel (see Fig. 27).

In other words this machine forms the mosaic panels with an angle of the hexagon always in the lead. Heretofore in attempts to form these panels one of the sides instead of an angle of the hexagon always led. This feature is elsewhere referred to more in detail. The result of such angular lead however permits the use of a more compact machine, narrower carriers, less width of the machine per row of tile and, greatest of all among the advantages, the entire absence of the problem of lateral staggering of the contiguous rows in the line of formation of the panels. The adjacent sides of the tile are parallel, longitudinally, not staggered. The staggered effect is transverse.

At the end of the inspection station the endless carrier chains 13 are led under idlers 55 and up an incline to the assembly storage chutes 53. At the top of the incline the carriers pass over other idlers which form the rear limit of travel, or head of the carriers. See Fig. 1.

The escapement devices at the end of the tile chutes 53 wherever present in the machine are constructed and operated upon one principle.

I have already described the tile escapement in the chutes leading from the hopper feed to the tile chain carriers.

At the ends of the storage tile chutes above the assembly drum the escapement devices are generally operated in pairs, the ends of the chutes being arranged in tandem formation Fig. 7. A plurality of these double chutes extend across the assembly drum. All the transverse chutes in double formation are operated from a single transverse shaft 57 arranged to be oscillated by a lever 58 having a roller 59 at its free end coming in contact with a series of equidistant pegs 60 on the drum 54. The escapement itself is a leaf spring 61 secured to a rock lever at one end and having at that end a stop 63. Suitable link mechanism 64 operated by the cross shaft 57 and lever 58 causes this escapement device to intermittently approach and recede from the tile chutes. This mechanism is appropriately timed to deliver tile to the tile seats on the assembly drum in the order desired.

Variations of this tile escapement device are shown in other parts of this machine, notably in the cross conveyer, and in the making and filling of voids on the drum described elsewhere in the specification.

This drum 54 is large enough in circumference to take care of six pasted sheets or sections of tile. The periphery of the drum is slotted crosswise, and cross slats 64 (Fig. 27) are placed therein which carry the pockets or seats for the tile. These slats are preferably of metal, and have cuttings made in the surfaces thereof into which are forced metal partitions 65 which make a seat or pocket for each tile.

The particular tile dealt with by this machine is known as one inch hexagon. It will be understood that any other size or shape of tile will require structural modifications in the machine.

As the tile are hexagonal the slats are milled with grooves running diagonally and thin pieces of steel 65 are inserted in these grooves and form part of the tile seats or pockets. These partitions besides being diagonal are angularly disposed, and breaks are provided therein at intervals in order that extraneous matter may not be caught therein.

The tile are fed with one of their angles foremost in the line of travel throughout the machine. The forward point of the angle of the tile rests in these diagonally arranged strips. Due to this arrangement, leading the tile with its point instead of its side forward, the tile are prevented from turning and clogging inasmuch as the pocket strips act as guides, and prevent the tile from being caught.

If the tile are fed to the assembly drum (as elsewhere described in the machine) with the point or angle leading forwardly, no clogging or interruption of the feed will result.

After the tile have left the inspection table or station 50, they are elevated to storage chutes 53 above the assembly drum, and discharged thereon through the proper escapement devices 56, these hexagonal tile will be deposited through the double escapements in two staggered rows on the assembly drum. By making the divisions of the pockets of the assembly drum angular or V-shaped two separate pockets may be combined into one and the rigidity of the divisions increased. Spaces 66 are provided in the longer dimensions of the tile so that in case chips or extraneous matter fall into the space of the tile it would not prevent the latter from seating itself properly in the pocket. By feeding the tile with the point or angle forward it is possible to handle them to better advantage in the machine, in the troughs, guide ways, carrier chains, pockets, and seats of the machine than would be possible if a side of the hexagonal tile led in the forward movement. One result is that it narrows the width of the machine and makes it more compact than is the case where the side of the tile moves forward first.

The paper 67 which is fed to the drum 54 and pasted upon the sections is cut by the machine so that at both ends and both sides of the pasted tile sections about one half of the area of each alternate tile projects beyond the edge of the paper. This is done for the purpose of facilitating the laying of the tile sections upon the floor or wall.

The assembly drum 54 is preferably of the width of one of the paper pasted sections. Two wheel castings are provided in the making of the drum, and slats 64 carrying the pockets of the tile span the distance between the wheels and lie equidistant upon the periphery of the drum, being securely anchored to the wheels at both ends.

Instead of feeding to a drum the hexagonal tile with their points or angles in the lead as described, I may feed the tile with their points forward to a pocketed board or other straight surface. In such a case the longitudinal contiguous or adjacent sides of the tile will be parallel along the line of feed instead of staggered as in the previous constructions and arrangements.

Connected with the head of the carriers are chutes 53, one for each carrier, which take off the tile 29 thereon and store them ready for use on the assembly drum. An automatically operated escapement 56 at the discharge end of the chute is provided for each storage chute for feeding the tile singly and successively as wanted to the drum 54.

For preventing the overcharge of the storage chutes with tile a regulating device D, Fig. 30, or temporary storage stop for each chute is located at the entrance thereof at the point where the tile take off from the endless carrier 13 after being elevated from the inspection station 50. There are twenty four in all. On the feed shafts of the carrier of the sorting devices B and C (the sizers and turnovers) there are throw off clutches 68 Figs. 16 and 17 one for each of the twenty four carriers acting to clutch and unclutch the tile feed whenever any one or more of the storage chutes are full. The clutches and storage stops are each connected by an operating wire 69 making it impossible to overfeed the tile to the storage chutes. At the same time it is essential that sufficient tile are in each storage chute above the assembly wheel. To this end it is necessary to intercontrol the drive and feed mechanism to prevent overstocking the storage chutes by providing an operating connection between the drive feed and each storage chute by an automatic throw out clutch for each carrier as has been stated.

Before describing this mechanism in detail it should be stated that the carrier chains after they have passed over the inspection station and been led upward over the assembly drum are again alternately separated into a double-deck D arrangement similar to the double-decking of the sorting mechanism B and C (the sizing and turn over devices) previously described in the earlier operation of the machine before the tile arrived at the inspection station.

In other words each alternate carrier, forming a series of twelve, is carried up to idler wheels a one horizontal level and the remaining twelve carrier chains terminate in a series of idler wheels at another horizontal level. The alternate series of storage chutes 53 (in the whole twenty four) receive the tile at the upper and lower decks, but the discharge ends of each series of the chutes are uniformly located just beyond and above the periphery of the assembly drum 54, in tandem formation.

The control device D for delivering the tile to the storage chutes and their connections to the drive feed for preventing an overstock in the chute do not influence the travel of the tile through the chutes.

A double ended trip lever 70, Fig. 30, for a storage chute in both the upper and lower chutes is pivotally mounted on a rock shaft 71 for operating a slide 72 for each chute. One pin 60 of a series of equidistant pins about the outer edge of the rotary assembly drum engages and operates the rock shaft and said slide through intermediate link connections 73, Fig. 7. Connected to this shaft and slide is a dependent ball lever 74 (acting in conjunction with a cataract 75) which comes in contact with any tile which may be in the chute. If there be no tile in the chute the dependent ball 76 moves up and down in the chute 53 and the slide 72 moves idly back and forward and no movement takes place at the upper end of the ball lever, nor any movement of the cataract connected thereto. Consequently no corresponding actuation of the throw-out clutch 68 on the drive shaft takes place although the two are connected to the upper end of the ball lever by a wire connection 69 and 76. When however there are tile in the chute the dependent ball comes in contact therewith. The top surface of the tile raises the slide 72, and in turn raises the trip lever 77 connected to the clutch by the wire, throws the clutch out, and stops the feed of that carrier chain. This mechanism D is a toggle motion as the rock shaft works backward and forward.

It will thus be seen that when the storage chute is full and the trip is thrown out of the clutch that the carrier chain stops and no more tile enter it.

In all phases in the base color machine, in the cross conveyer mechanism for feeding colored or contrasting tile to the base color machine, and in the mechanism for making and filling voids all of which are hereinafter described, some form or development of the regulating device D or automatic watchman is employed to prevent the overcharging of the storage chutes which feed the tile to the assembly drum.

In the base color machine before described the automatic watchman detector D is constructed in duplicate, and operating in connection with the duplicate series of tile storage chutes. In the form described a rock shaft 71 is located transversely of the machine in the neighborhood of the assembly drum. A series of equidistant pins 60 are located near the periphery of the assembly drum. A lever 58 is pivoted to the frame to be operated by these pins and connected by linkage 73 with a cross shaft for the purpose of oscillating the latter. Projecting from the cross shaft oppositely are two arms 70 rigid with the shaft. To each of these arms are attached the detector mechanism which ascertains whether or not the chutes contain tile or are empty. To describe one of the detectors or automatic watchmen is sufficient inasmuch as both of them are alike.

A reciprocating slide 72 is connected with the rock shaft arm, and from the slide is pivoted a pending lever 75, the lower end of which is preferably spherical in shape. The upper end of the lever carries a pin 79 which works in a slot 80 in a bell crank lever 77. The spherical contact end 76 moves up and down in the tile chute. If there are no tile in the chute the ball moves up and down as the slide moves backward and forward, and no movement is transmitted by the upper end of the ball lever, inasmuch as it idly vibrates in a slot therein. This bell crank lever is so set that when there are no tile in the chute it is thrown to "Run" position. This means that the bell crank through a wire connection has thrown in the clutch which controls the feeding mechanism and that the base color machine in all its essential parts is feeding tile regularly and depositing the same in that storage chute. Should there be tile in the storage chute extending from the escapement mechanism up to the automatic watchman the spherical ball will come in contact with the tile. The ball will be raised thereby which in turn raises the slide and the trip bell crank lever is actuated to throw the clutch on the tile feeding mechanism out of gear. The feeding of tile along that line chute and carrier chain is thereby stopped until sufficient tile are fed out of the storage chute, whereupon the automatic watchman again acts to throw said clutch again into feed position. The detector mechanism is essentially a toggle motion as the rock shaft works forward and backward.

In the development of the automatic watchman as shown in connection with the cross conveyer system hereafter described, the tile pass into the chute 53 and are likewise stored pending the operation of the escapement devices 56 at the end thereof. This detector mechanism ascertains whether the chute is full or partly empty. The rock shaft and its arm are pivoted to reciprocatingly slidable linkage. Pivoted angularly to this reciprocating slide is a lever the lower end of which is preferably spherical and the upper end slotted to receive a pin of a pivoted bell crank lever.

The spherical end of the link is alternately lifted and lowered in the reciprocation of the slide. The slotted upper end of the link makes in a like manner alternating movements up and down. A spring 81 keeps the sliding ball in contact with a guide surface for the slide. The bell crank has a pin entering the oblong slot at the other end of the spherical contact end of the lever.

About the pivot point of the bell crank is arranged a knife edge or angular abutment which works in connection with a cataract 75 having a similar angular edge which acts to rather violently throw the bell crank into either one or the other of two opposite positions which are termed "Run" and "Stop." If the tile chute is empty the spherical end of the link travels up and down from a lower position where it just fails to touch the bottom of the chute to its highest position in which it will clear the highest tile for which the machine is constructed. The bell crank is in "Run" position when the spherical lever enters the chute and finds no tile therein. The slotted end of the linkage opposite the spherical end likewise travels up and down, its oblong slot being adjusted to the pin of the bell crank so that it will impart to the latter an impulse, though not sufficient to throw it past the vertical point guarded by the cataract spring. As long as the chute is empty the bell crank will be seen to wobble somewhat without being able to pass this neutral position.

The spherical end of the lever is not disturbed when it is located above the highest tile. If however the chute is full of tile, the spherical end 76 in descending soon touches a tile. Its further descent is arrested and therefore its other end must go up. This up-movement is transferred ultimately to the slotted end of the link and the bell crank is given a sufficient impulse to throw it over the neutral point of the knife edge position of the cataract when the latter goes into action and throws the bell crank to the opposite or stop position. As before mentioned as long as the chute is full of tile the bell crank in this new position will wobble around without being able to leave it.

The device of the automatic watchman does not cramp the tile or interfere with or influence the movement of the tile down the chute.

To guard against any possibility of the spherical end of the lever on its downward travel exactly meeting a tile sliding down the chute with a tendency to throw the bell crank into stop position I provide a spring guard 81 which will prevent such a meeting or action. This spring is formed of a leaf secured at one end to the frame and projecting into the path of the tile at the other before the tile reach the spherical lever.

This spring also bears slightly upon the spherical lever at 82 urging it somewhat slightly toward the tile chute. When the spherical lever moves toward the chute the projection or stop on the spring moves down, but much faster, and in so doing it blocks the tile momentarily which may enter the chute sufficiently long to prevent the above mentioned coincidence. The movement of this bell crank is transmitted by means of wire linkage through bell crank and lever connections to a lever and pin of the parallel rail and gate cross conveyor system. The gates of the drag chain feed are pivoted upon this pin.

The paper 67 for pasting the tile sheets or panels is taken from a roll 83 near the base of the machine, and carried upwardly over certain guide rolls to a pair of pinch rolls 84 which are the main feed impelling device for the paper. In its travel toward the pinch rolls it passes through two pairs of circular shears 85, which trim the edges of the paper. The paper then passes to a paper timing mechanism 86, thence to the feed or pinch rolls 84, thence over the paste applying rolls 88 which apply the paste to one side of the paper. Above the paste rolls is a tank 89 for supplying the paste.

In the farther passage of the paper it passes across a pair of transverse cutting shears 90 which cut the paper transversely at proper intervals. Thence the paper passes downwardly with the adhesive thereon to the periphery of the assembly drum 54.

Elsewhere I have described the feeding of the tile to the assembly drum in predetermined formation whether in mono-color or multi-color. After the tile are assembled upon the drum the adhesive paper is brought into contact with the drum and the tile thereon by means of rollers 91 and 92 and an endless tension belt 93 which presses the paper closely to and pastes the paper to the tile.

At this point a heating device 94 having a surface coincident with the drum and tension belt may be applied to hasten the drying of the paste. The pasted paper sheets are then led to the carrier and chute 95 which delivers them to the stacking mechanism E described in another part of this specification.

After the endless paper has passed over the pasting rolls it is cut transversely by shears 90, the operating of which is timed so that ordinarily a uniform series of pasted tile sheets or panels are successively fed to the assembly drum.

After the paper has been sheared transversely at the proper interval the incoming continuous unsheared pasted sheet is carried along horizontally into contact with a peg roll 96 (or other paper directing medium) which causes the incoming horizontally projecting unsheared pasted sheet to be bent downwardly and urged or fed through a downwardly projecting guide 97 into contact with the assembly drum and cause it to adhere to the next succeeding panel of tile thereon.

All the rolls for feeding, timing, pasting and cutting the paper (including the transverse shears), paper deflecting mechanism and tension belt, for pasting paper to the tile are driven by a system of gearing and chains from a main drive shaft 98, 98', Fig. 1. The drive is through a chain and sprocket mechanism 99 which gives the necessary intertimed movement to the various elements. The cutting off or transverse shears 90 are driven by a cam which makes one turn for each sheet of tile that is pasted. As the assembly drum in this instance is designed to accommodate six sheets of pasted tile, this cam shaft will make six turns to one turn of the assembly drum. This construction insures the paper being cut off at each of the six different pasting sections.

The cam shaft is provided with a clutch mechanism for driving the feed or pinch rolls 86. The clutch is a rotary one and provided in this instance with fifteen teeth.

In the operation of the machine the feed of the paper is timed so that the end of the paper on each tile-sheet or panel covers one-half of the first row of the tile of the panel, and it ends so as to cover one-half of the last row of tile, in order to prevent any overlapping of the paper when the tile sheets are assembled on the floor or wall.

The timing cam 100, Fig. 35, for this purpose is keyed to the feeding devices and moves endwise, and operates a clutch 101 through a bell crank 102 which is connected to the clutch.

Variations in timing of the sheet feed are made by changing the contour of this cam 100. A mechanism for varying this timing is effected by making the cam double and just one-half past the other. The width of the roll in this case is doubled from that previously described so that one-half of the cam would act on the entering side and the other one-half on the leaving side.

The feed rolls 86 stop a certain length of time, depending upon the number of tile that are pasted in each panel or sheet, and if a full sheet is not desired the feed rolls will dwell the necessary amount of time to adjust the feed of the paper to the tile.

After the tile have been assembled in panels upon pasted sheets they leave the assembly drum and are discharged therefrom upon on inclined carrier and guide 95 and fed to the stacker mechanism E. This stacker mechanism is in duplicate or in pairs. While the mosaic panels are being piled on one stacker, the previously completed stack is being unloaded. The whole device is automatic.

The stacker mechanism consists of an endless carrier mechanism 103 upon which are located a number (six in this design) of pallets or trays 104 which are fed horizontally along the endless carrier. The movement of the pallets upon the endless carrier is timed to correspond with the speed of the circumference of the assembly drum. The pallets are hinged at their forward ends to the endless carrier on each side of the pallets. The rear ends of the pallets carry rollers 105 which are guided and supported by a frame rail 106. The relative level arrangement of the pivoted forward end and the roller-supported rear end is designed to give the pallets a slight downward inclination from front to rear to assist the removal of the mosaic tile panels from the pallets at the proper time. The carrier chain moves away from the assembly drum and the pallets pivoted thereto receive the tile panels from the drum and carry them until the first stacker station is reached.

Each stacking station consists of a flat table as 107 and 108 upon which the tile panels are successively deposited. The stacker table is constructed to intermittently lower the stack automatically about the thickness of one tile panel as these panels are successively placed thereon.

When a number of panels are placed one above the other (say ten) on the table 107 it is unloaded. While it is being unloaded the mosaic tile panels are successively built upon the duplicate stacker table or plate 108 in the same manner as they were built upon the first table.

The frame rail or track 106 which carries the rear ends of the pivoted pallets is disposed in sections at different angles and heights. When the pivoted front end of one pallet moves around the wheels 109 and 110 that support the carrier the rear ends of the pallets are dropped down over curved extensions 111 and detached angular connections thereof to a lower frame guide rail 112 so that the pallet is moved backward at a lower level in its endless movement. The pallet then moves back on the lower track 106, reversed as to direction. Thereafter the rollers at the rear end of the pallet reach an angular, backwardly inclined extension 113 of the frame guide rail and the pallet is lifted back again to loading position. When this movement is taking place the front pivoted end of the pallet moves around the carrier chain upon the rear sprocket wheel 109 and comes up in loading position again in the neighborhood of the inclined carrier 95 and guide from the assembly drum to receive a succeeding paper-pasted mosaic tile-panel from the drum.

In the exemplification there are six of the pallets or trays.

The stacker table 107 next the assembly drum is first loaded. In proximity to this stacker is located a stripper or gate mechanism. As the tile-panels on the successive pallets pass over the stacker table each encounters the stripping mechanism. This stripper or gate 114 holds the tile-panels against further movement. The pallet moves forward and the panel is therefore stripped therefrom and deposited upon the table. The table automatically drops the thickness of a panel each time that a panel is wiped from the pallet and deposited upon the table.

At the end of say ten successively deposited tile-panels the stripper gate 114 is adapted to be elevated or opened. Thereafter all tile-panels, not being arrested by the stripper gate, pass along with the carrier to the second table where precisely the same operation is completed and ten panel sections deposited thereon, while the first table is being unloaded in packing boxes for the commercial tile sections, or mosaic tile sheets.

The stripper 115 for the second table last described is stationary and needs no gate operating mechanism for lifting it from the path of the pallets.

Each stacker table is lowered and raised by a mechanism in duplicate consisting of a rotary cam 116 which rotates to intermittently lower the table just sufficient to take on the next pasted sheet of tile. A one-half revolution of the cam brings the table to its lowermost position and the other one-half revolution raises the table to its topmost position, or the point where the loading commences. This cam is provided with a radial taper, and is given a slight movement endwise so that the intermittent lowering of the table may be varied to correspond with any variation in thickness of the tile treated.

If the tile were one quarter of an inch thick the cam would be arranged to lower the stacking table that distance. A hand-wheel rotary adjustment for the lateral shifting of the cam is provided at 117 in order to take care of thicker or thinner tile and the paper pasted thereon, and the cam by this mechanism is brought into proper relation to compensate for thinner or thicker tile.

The machine at present being described is expected to deposit one pasted sheet of tile on one of the stacker tables every fifteen seconds. The heretofore described cam 116 for raising and lowering the stacker has associated with it a ratchet wheel 118 (Fig. 25) with twenty pegs or teeth 119 located on the same shaft 120. One revolution of the cam produces one-twentieth revolution of the ratchet wheel. Ten revolutions of the cam move the ratchet wheel one-half revolution. Ten pegs or teeth of the ratchet wheel correspond to a one-half turn of the cam. The other ten pegs or teeth serve to raise the table up to its top position.

The periphery of the stacker-operating cam, 116, or substantially one-half thereof is provided with a series of cam faces 121 each one of which is fashioned so that the table drops say one-fourth of an inch which drop is followed by an intermittent dwell (each of the cam faces being similarly fashioned).

Adjoining the ratchet wheel mentioned above is another cam 122 with two lobes. One complete revolution of this latter cam serves to raise and lower the gate 114 of the first stacker mechanism so that after ten sheets of tile are deposited on the first stacker table the gate of the stripper rises and allows the pallets carrying the succeeding paper-pasted tile sheets or panels beyond the first stacker to be deposited upon the second stacker table, in precisely the same manner. The gate of the stripper for the first stacker is lifted by a crank on the end of a shaft 123 geared to the gate ratchet 124.

The latter is provided with eight teeth or pegs 125. In this case the ratio is 14:56. The gate ratchet is operated by a counterweight 126. The lowering ratchet 118 is operated by a spring 127. A band brake 128 connected with the lowering ratchets compensates for the varying loads on the two tables to prevent racing of the tables as the load increases.

The drive of the main carrier chain for operating the pallets is connected with the drive of the assembly wheel or drum and timed to move in unison therewith.

I may modify the construction of the hereinbefore described machine by double decking the whole machine. That is, I may put one complete unit above another and feed them both to the storage chutes above the assembly drum.

I contemplate not only double decking the units but applying double decking methods on both sides of the assembly drum. In the latter instance two double deck tile machine units 129 are placed in the rear of the assembly drum as well as in the front. That is, upon both sides as in Fig. 45. The chain carriers 13 are modified so as to carry all the tile to the storage chutes above the assembly drum. In this construction the storage chutes 130 will all incline uniformly practically at the same angle in parallel formation.

In making pasted tile sheets it is frequently desirable to add to or vary the base or primary color of the tile by introducing odd tile, rosettes, or the like, and generally of contrasting color. In order to perform this work and to place such contrasting colored tile at the proper designated points the machine is caused to omit the dropping of one or more tile, and at a subsequent operation to drop into such voids the rosette, odd tile, or the like, the first operation of the machine making voids—the second filling voids.

Adjacent to the tile escapement of the base colors I mount a selector roll 130, Fig. 51, driven by the same mechanism that rotates the main drum 54, and relatively timing the two so that the selector roll makes one revolution per pasted sheet to one sixth of a revolution of the main drum. The main drum cares for six pasted sheets of tile and the selector roll therefore rotates six times to one revolution of the drum.

The selector roll carries pegs 132 disposed about its periphery to correspond to the places in the assembled design where a tile contrasting in color to the base color is to be placed. There are two of the selector rolls for two colors, one operating the escapement device 133 of the base color to intermittently prevent depositing tile at designated points, and the other selector roll 134 operates the escapement mechanism 135 of the contrasting tile, so that they are fed into the voids created by the first roll. Both selector rolls rotated at the same speed and both are driven by the main drum, at the rate of rotation of 6:1.

The void making escapement is operated by pins 60 on the main drum. A lever 136 is pivoted on the escapement carrying roller 136' adapted to come in contact with pegs 60 and oscillate the lever. This lever is connected with a link 137 for oscillating a shaft 138 running crosswise of the machine. The shaft has a blade 139 that engages the escapement levers 140 under normal conditions. The proper movement for the assembling of the base tile is therefore provided.

The pins or pegs 132 which are each placed on the selector roll for making the voids come in contact with the escapement levers 140 and move them away from the roll. Just at this time the primary motion for releasing the tile from chute 141 takes place and all the escapements are raised up clear of the blade 139 on the shaft above described. The tile are thus retained in the chutes that correspond in position to the pins 132 on the roll, preventing their escape and thereby creating the voids.

After the voids have been created the assembly drum in its further rotation clockwise brings the voids or empty spaces under the escapement device 135 for supplying the contrasted colored or formed tile.

This escapement mechanism is very similar to the one just described. It has no primary lever mechanism in contact with the drum. The escapement devices are operated by another pinned selector roll 134 similar to that above described and, through the drive mechanism, make 6 revolutions to one of the drum, or one revolution for each pasted sheet of tile. The pins 142 of this selector roll correspond to the tile that are to be dropped in the voids. And they also correspond with the pins on the selector roll creating the voids.

Additional mechanism of this character may be employed for making and filling voids of more than one contrasting color. In such case additional mechanism would be supplied—one set for each color treated.

Speaking more definitely the mechanism for making the voids in a plurality of colors or contrasts would be the same, but the selector roll for the voids would have as many pins in it as the sum of the pins on the first, second, third, &c, auxiliary selector rolls. The pins on each of the auxiliary rolls would correspond with the color of the pattern desired.

It should be understood that the mechanism for making and filling voids is confined to the introduction of contrasting colors in definite places where a base or primary color is employed, say white. This mechanism is not the same as is required when a mosaic pattern of different colored tile is being composed and pasted upon paper sheets. Elsewhere the machine is adapted for combining mosaic patterns in which there is really no base or primary color.

For producing multi-colored patterns in which properly there is no base color the principal difficulty is in keeping the size of the machine compact and within practical bounds. A machine for handling four colors is about the limit to which a machine can be employed where all colors are treated in the same structural way.

By the use of a cross conveyer mechanism however I may utilize any number of colors without materially enlarging the bulk of a multi-color machine. This cross conveyer, no matter how many colors are employed is always structurally the same. In the cross conveyer the feed mechanism is located at right angles to the flow or feed of the base tile. The tile which are used more numerously in a design than any of the other tile I term the base tile. The base tile are treated in other parts of this machine. This cross conveyer system is designed to feed any number of contrasting tile less numerous than the base tile.

The principal part of the cross conveyer is a drag link chain 143 to each second link of which is attached a swivelling bar 144 pivoted thereto and having at its free end two flanged rollers 145 and a downwardly projecting bar 146 adapted to engage and move the tile. These flanged rollers travel on a parallel system of rails 147. The chain and its drag link move over a series of pivoted gates 148 each one of which is connected with one of these rails by means of a pin 149. These gates are capable of swinging open and shut. When one of the gates opens it lifts one pair of parallel rails. When the gate closes it lowers that pair of parallel rails. There is one pivoted gate for each pair of rails.

In the drawings for purpose of illustration I have shown six pairs of parallel rails 147. There is one gate for each pair. The top surfaces of all the gates are flush or level. The center of each gate has a slot wide enough to let the drag link bars freely pass when the gate is open. Underneath each gate is an inclined chute 53 in which the tile travel to the escapement devices to be fed to the assembly drum.

The tile on the way to the storage chutes and escapement devices pass a mechanism which ascertains whether the chute is full or partly empty. This mechanism is a development of a similar device for the same purpose located upon the base color tile assembly part of the machine.

The mechanism for driving and feeding the tile in the cross conveyer is actuated by means of a cross shaft 149 mounted on the frame 150 at right angles to the line of the drag link feed. This shaft is provided with a sprocket 151 from which it receives motion from the rest of the machine by a chain drive. A groove is formed in this shaft which engages a tooth on a lever pivoted in a loose sleeve 152 eccentric with the shaft. A spring causes the tooth to move toward the groove. This loose sleeve carries an eccentric strap to which is attached a reciprocating rod or pitman 153 which operates a ring and a sleeve 154 mounted on another cross shaft 155 parallel with the one just mentioned. A lever 156 mounted on this shaft carries a ratchet pawl 157 engaging with a wheel 158 on the same shaft having ratchet teeth on the inside of the wheel.

The drive from the chain is received through the first sprocket wheel and its shaft to the groove therein at which point a tooth on the lever anchored in the loose sleeve picks up the motion and transfers it thereto. The eccentric strap on the loose sleeve transforms the rotary movement into reciprocating movement of the pitman rod just described, and, passing through the elements recited to the pawl engaging the wheel having the inner ratchet teeth thereon. This pawl alternately swings from left to right without imparting any movement to the wheel. When however the ratchet moves from right to left it engages the ratchet wheel and intermittently gives a slight movement to it.

This latter wheel it will be seen moves intermittently, the time of movement and the time of standing still being approximately equal. The tile are fed to the drag link chain by means of escapement devices described elsewhere, and are intermittently pushed forward by the feed devices just described until the first tile in the advance movement reaches the first open gate. The tile drops in this gate and is conveyed down the inclined chute to be subsequently dealt with.

Each pair of the series of six rails have an independent up and down movement inaugurated by the pins connected thereto, and are partly counterbalanced by flat weights 159 attached to levers 160 connected to the rails, with wire connections 161 between the same.

In the neighborhood of the rails at a point where they are counterbalanced I provide a third cross shaft 162 parallel with the first and second previously described and located above an angular notch 163 in the rail 164 which is partially covered by a flat spring. At one side of the notch is a vertical rod 165 pivoted thereto and having a tooth 166. A spring 167 impels this pivoted rod towards the shaft. There is one rod for each rail and the rod and springs for operating them are staggered because of the limited operative space. The shaft 162 just described carries two sleeves 168 and 169 each having an indentation or groove 170 corresponding at certain times with the series of teeth (one for each rod) on the pivoted rail-lifting rods 165. A bell crank 171 located on the shaft has an arm carrying a cross bar 172. On the shaft of the bell crank is an arm provided with a spring 173 impelling the cross bar to the left. The whole movement has a tendency to revolve clockwise.

At one end of this shaft above the rails is located a cam 174 having a depression 175, and on this cam works a rod 176 provided with a roller 177 engaging the cam. A spring keeps the cam and roller 177 of the rod in contact. The other end of the rod engages a pivoted lever 178 in the neighborhood of the first cross shaft drive. The upper end of this lever is vibrated or oscillated so that it may or may not interrupt the movement of a bar projecting from the lever whose tooth engages the notch 179 in a disk 180 on the first cross drive shaft 149.

Imagine all the tile of the chutes to be full as shown by the drawings. The spherical feeler 70 of the automatic watchman Fig. 31, described elsewhere, turns the bell crank lever 77 to "Stop" position. From this bell crank there is a linkage of piano wire 76 to a second bell crank 181, Fig. 41, carrying a connecting rod 182 which operates a lever 160, Fig. 44 on a pin 149 connected with one of the pivoted gates 148 shown in its closed position. All the gates are closed when the bell crank of the automatic watchman is at "Stop" position. All the parallel rail systems will be down, in which position the rails 164 free the oscillating bar of the bell crank 171, and under the influence of a spring connected with the latter it rotates until it strikes a stop on the frame. The cam 174 on the same shaft as the bell crank turns sufficiently to lift the roller 177 on the lever in contact therewith out of the depression in the cam. It is this movement that is transferred to the roller carrying lever and pivoted link having the projecting arm, throwing such arm into the path of the bar of the pivoted hook engaging the groove in the first named cross drive shaft 149. The bar of this hook being thus impeded in its travel causes its tooth end to swing out of said groove 179 and thereby disengages the sleeve on the main drive shaft from the said shaft. The flow of power being cut off the ratchet wheel 158 on the shaft 155 and the drag link chain mechanism come to a stop.

Let us now imagine that one of the tile chutes 53 is getting empty. In this case the automatic watchman turns the bell crank from "Stop" to "Run" position Fig. 31, and the corresponding linkage described above opens that particular gate 148. The opening of the gate lifts a corresponding parallel pair of rails 164 above the general level of the rails. When the rails 1 are being lifted the corresponding rod 165 pivoted to that particular pair of rails turns the rotary shaft 162 connected thereto anti-clockwise by reason of the tooth 166 on the pivoted rod engaging a depression or tooth 170 upon said shaft. This shaft turns until the bar on the bell crank fast with said shaft, turning also anti-clockwise, enters the slot in the parallel rail and the spring thereon snaps it into position. The cam 174 on this shaft also turning anti-clockwise rotates until its depression comes under the roller in contact therewith on the cam lever rod. This rod under the influence of a spring thereon then moves to the left. This movement transferred through the hereinbefore described pivoted lever turns the bar on the other end of said lever out of the path of the rotary stop bar of the pivoted hook of the lever. This latter lever is now only under the influence of a spring which urges it against the revolving disk 180 on main cross shaft 149 until the groove and tooth engage. This again connects up the power drive between the driving sprocket 151 and the sleeve which drives the eccentric and connected piston rod and the latter goes into action and re-establishes the intermittent movement of the drag link chain. A pawl and stop is provided to prevent any back sliding motion of the sleeve operating the eccentric piston rod.

The tile are propelled along the drag link chain and over the gates by the bar 146 depending from the swivelling roller drag links of chain 143 located above the rails when the rollers of said links are forced to travel on the elevated pair of rails. The raising of the rails lifts this operating bar above the tile so that the latter remains stationary while the chain moves or feeds.

If for instance there are from left to right twelve gates and gate 7 is opened then all the tile on the left side of the gate remain stationary. This action prevents the group of tile to the left of one particular gate from being dragged to the left, and, not finding any gate open, would have to be caught in a hopper and thereafter returned occasionally to the sorting end of the machine. In other words the swivelling drag links make it possible to utilize every tile fed into the cross conveyer. No tile is returned.

The intermittent motion of the drag link chain is essential for two reasons. First the tile 29 about to drop through a gate require a certain time for it to act. With an intermittent motion this time element is increased. Second the tile must be fed into the drag link chain by an escapement and here too the time element is increased. This escapement is operated by a horizontal rod. By means of a piano wire connection the colored or contrasting tile sorting machine is stopped whenever the drag link chain stops. The other end of the wire is connected to a clutch engaging mechanism identical with the one shown and described in connection with the base or primary color machine.

As many cross conveyers may be used as desired. They vary from one another only by a difference in length and difference in location of the escapement for admitting the tile.

As a development of the cross conveyer type of machine I may employ a machine dealing with four contracting colored tile, the base color part of the machine being identical with the main machine and two or more contrasting colors supplied thereto by cross conveyers depositing in chutes arranged to deliver the tile properly to the assembling drum wheel. This arrangement can be used for a limited quantity of colored tile in each panel.

A further development of the machine will be to supply four colors in any quantity and for any design as in Figs. 49 and 50. To do this it will be necessary to arrange four set of feeding elements together with the heretofore mentioned, sizing, turning over and inspection stations. All of these four units will lead to one assembling drum 54 and embody the various elements as heretofore specified. A machine of this capacity would be of a width double that required for the one color which would mean forty-eight chains in width and mounted above this would be a duplicate machine with forty eight chains, and each to have all of the necessary stations as heretofore described.

However many colors may be used, if the tile are placed indiscriminately through a design in quantities without using a solid base color, then it is necessary to have a corresponding number of feeding, sorting, turning over and inspection stations. In such a case the assembling drum, the passing inspection station, carry-off and storage stations are common to and used by all the multiple feeding elements.

I may modify the construction of this machine by providing two distinct units for feeding, inspecting, and delivering the tile to the assembly drum in tandem formation. One of these complete units is mounted one above the other vertically and alongside each other laterally. The storage chutes for delivering the tile to the drum are set at an angle and the tile delivered intermediately between the two units. The assembly drum is intermediate of the two units and receives tile from both. The mechanisms for treating the pasted tile sections after they leave the drum are identical with the machine described elsewhere.

Claims:

1. In a tile assembling machine, the combination with an endless conveyer and means for feeding tile thereto, of sorting means for receiving tile from the conveyer and distributing some of the tile to the conveyer, a movable inspection station comprising a portion of the conveyer, and means for delivering the remaining sorted tile to said station.

2. In a tile assembling machine, the combination with a conveyer and means for feeding tile thereto, of sorting means for receiving all of the tile from the conveyer, and means in the sorting means for distributing some of the sorted tile to the conveyer.

3. The combination with an inspection station including a conveyer, of a storage chute and means for conveying tile thereto, means for controlling the delivery of tile to said chute to a predetermined storage capacity, and an assembly drum adapted to receive the tile from said chute.

4. The combination with a tile assembly drum, of a web feeding mechanism and means for forming sections of said web, and means for automatically and successively applying said sections to a given area of pre-arranged tile on the drum.

5. The combination with a rotary assembly drum, of means for applying a separate adhesive backing to a given area of tile thereon, means for heating the backed tile-section, and means for delivering the tile section from said drum.

6. The combination with an assembly drum, of a paper-strip feed-mechanism, means for severing said strip into sections, means for applying an adhesive to said sections, means for applying an adhesive section to a given area of tile on the drum, a conveyer and means for discharging the tile sections thereto, and a stacking mechanism co-acting with said conveyer.

7. The combination with an inspection station including a conveyer, of a storage chute and means for conveying tile thereto, means for controlling the delivery of tile to said chute to a predetermined storage capacity, an assembly drum adapted to receive the tile from said chute, and means for controlling the feed of tile from the chute to the drum.

8. The combination in a tile assembling machine with a storage chute and means for conveying tile thereto, of means for controlling the delivery of tile to said chute to a predetermined storage capacity, an assembly mechanism adapted to receive tile from the chute, and means for controlling the feed of tile from the chute to the assembly mechanism.

9. The combination with a plurality of endless chain conveyers and a complementary series of storage chutes, and means for controlling delivery of tile to said chutes to a predetermined storage capacity, of a rotary tile assembling drum adapted to receive tile from the chutes, and means operated by the drum for controlling feed of tile from the chutes to the drum.

10. The combination with an inspection station including a plurality of conveyers, of a plurality of storage chutes and an elevator comprising said conveyers for delivering tile to the chutes, a rotary assembly mechanism adapted to receive tile from the chutes, and means operated by the rotary assembly mechanism for controlling feed of tile from the chutes to said mechanism.

FRANK B. YINGLING.